（12）United States Patent
Frusina et al.

(10) Patent No.: US 11,563,788 B2
(45) Date of Patent: *Jan. 24, 2023

(54) MULTIPATH DATA STREAMING OVER MULTIPLE NETWORKS

(71) Applicant: DEJERO LABS INC., Waterloo (CA)

(72) Inventors: Bogdan Frusina, Kitchener (CA); Akos Horvath, Kitchener (CA); David Pui Keung Sze, Waterloo (CA); Barry Gilhuly, Waterloo (CA); Cameron Kenneth Smith, Oakville (CA); Joseph Robert Wayne Mallet, Kitchener (CA); Robert Flatt, Kitchener (CA)

(73) Assignee: DEJERO LABS INC., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,911

(22) Filed: Jun. 2, 2021

(65) Prior Publication Data
US 2021/0289014 A1 Sep. 16, 2021

Related U.S. Application Data

(63) Continuation of application No. 16/655,677, filed on Oct. 17, 2019, now Pat. No. 11,032,339, which is a (Continued)

(51) Int. Cl.
H04N 21/61 (2011.01)
H04L 65/611 (2022.01)
(Continued)

(52) U.S. Cl.
CPC ............ H04L 65/611 (2022.05); H04L 5/003 (2013.01); H04L 5/0053 (2013.01);
(Continued)

(58) Field of Classification Search
CPC ..... H04L 5/003; H04L 5/0053; H04L 5/0058; H04L 65/4076; H04L 65/4092;
(Continued)

(56) References Cited

U.S. PATENT DOCUMENTS 6,542,481 B2  4/2003 Foore et al.
6,834,044 B2  12/2004 Sugirtharaj et al.
(Continued)

FOREIGN PATENT DOCUMENTS

CA  2505936 A1  5/2004
CA  2671266 A1  1/2011
(Continued)

OTHER PUBLICATIONS

European Patent Office, Communication and extended European search report dated Jun. 8, 2011, issued on European Patent Application No. 10168544.4.
(Continued)

Primary Examiner — Oanh Duong
(74) Attorney, Agent, or Firm — Norton Rose Fulbright Canada LLP

(57) ABSTRACT

Embodiments described herein relate to real-time streaming of large quantities of time critical data over multiple distinct networks from a communications device. More specifically, embodiments described herein may address challenges and problems of maintaining consistent data reception quality when faced with the anomalies of a moving sender that is sending data using a relatively unstable method. This may be achieved by converting single source data into multiple data streams, placing them in transport buffers and storing them for forwarding.

20 Claims, 13 Drawing Sheets

Related U.S. Application Data continuation of application No. 16/024,341, filed on Jun. 29, 2018, now Pat. No. 10,547,656, which is a continuation of application No. 14/341,057, filed on Jul. 25, 2014, now Pat. No. 10,033,779, which is a continuation-in-part of application No. 12/499,151, filed on Jul. 8, 2009, now Pat. No. 8,873,560.

(51) Int. Cl.
| | |
|---|---|
| *H04L 5/00* | (2006.01) |
| *H04N 21/234* | (2011.01) |
| *H04N 21/2343* | (2011.01) |
| *H04N 21/44* | (2011.01) |
| *H04N 21/462* | (2011.01) |
| *H04N 21/63* | (2011.01) |
| *H04N 21/6373* | (2011.01) |
| *H04N 21/6377* | (2011.01) |
| *H04N 21/658* | (2011.01) |
| *H04L 65/613* | (2022.01) |

(52) U.S. Cl.
CPC .......... *H04L 5/0058* (2013.01); *H04L 65/613* (2022.05); *H04N 21/2343* (2013.01); *H04N 21/23406* (2013.01); *H04N 21/44004* (2013.01); *H04N 21/4622* (2013.01); *H04N 21/6131* (2013.01); *H04N 21/631* (2013.01); *H04N 21/6373* (2013.01); *H04N 21/6377* (2013.01); *H04N 21/658* (2013.01)

(58) Field of Classification Search
CPC ......... H04N 21/23406; H04N 21/2343; H04N 21/44004; H04N 21/4622; H04N 21/6131; H04N 21/631; H04N 21/6373; H04N 21/6377; H04N 21/658
See application file for complete search history.

(56) References Cited

U.S. PATENT DOCUMENTS

| | | | |
|---|---|---|---|
| 8,094,713 B2 | 1/2012 | Clark | |
| 8,175,404 B2 | 5/2012 | Bichlmaier et al. | |
| 8,265,165 B2 | 9/2012 | Park et al. | |
| 8,683,542 B1 | 3/2014 | Henry | |
| 8,873,560 B2 | 10/2014 | Frusina | |
| 8,897,322 B1 | 11/2014 | Woleben | |
| 9,282,337 B2* | 3/2016 | Dong ................ | H04N 21/6587 |
| 10,033,779 B2 | 7/2018 | Frusina | |
| 10,547,656 B2 | 1/2020 | Frusina | |
| 11,032,339 B2* | 6/2021 | Frusina .............. | H04N 21/6131 |
| 2002/0114332 A1 | 8/2002 | Apostolopoulos et al. | |
| 2003/0067872 A1 | 4/2003 | Harrell | |
| 2003/0156601 A1 | 8/2003 | Planka | |
| 2003/0185249 A1 | 10/2003 | Davies et al. | |
| 2004/0016000 A1 | 1/2004 | Zhang et al. | |
| 2004/0095907 A1 | 5/2004 | Agee | |
| 2004/0146211 A1 | 7/2004 | Knapp et al. | |
| 2004/0202249 A1 | 10/2004 | Lo et al. | |
| 2005/0060421 A1 | 3/2005 | Musunuri et al. | |
| 2005/0073725 A1 | 4/2005 | Lim | |
| 2005/0163093 A1 | 7/2005 | Garg et al. | |
| 2005/0180415 A1 | 8/2005 | Cheung et al. | |
| 2005/0210515 A1 | 9/2005 | Roh et al. | |
| 2005/0259729 A1 | 11/2005 | Sun | |
| 2007/0177579 A1 | 8/2007 | Diethorn et al. | |
| 2007/0178932 A1 | 8/2007 | Miklos et al. | |
| 2007/0300234 A1* | 12/2007 | Dekel ................ | H04L 12/1868 |
| | | | 719/313 |
| 2008/0165727 A1 | 7/2008 | Xiaoben | |
| 2009/0110060 A1 | 4/2009 | Cortes et al. | |
| 2009/0168701 A1 | 7/2009 | White et al. | |
| 2009/0278941 A1 | 11/2009 | Smith et al. | |
| 2009/0279483 A1 | 11/2009 | Falchuk et al. | |
| 2009/0323803 A1 | 12/2009 | Gomila et al. | |
| 2010/0008245 A1 | 1/2010 | Viger | |
| 2010/0041397 A1 | 2/2010 | Chutorash et al. | |
| 2010/0054329 A1 | 3/2010 | Bronstein et al. | |
| 2010/0080287 A1 | 4/2010 | Ali | |
| 2010/0082810 A1 | 4/2010 | Patel et al. | |
| 2010/0192212 A1 | 7/2010 | Raleigh | |
| 2010/0232498 A1 | 9/2010 | Liu et al. | |
| 2011/0051807 A1 | 3/2011 | Liu et al. | |
| 2011/0249127 A1 | 10/2011 | Zhang | |
| 2011/0295727 A1 | 12/2011 | Ferris et al. | |
| 2012/0020298 A1 | 1/2012 | Shon | |
| 2012/0260296 A1 | 10/2012 | Mallet | |
| 2012/0294355 A1 | 11/2012 | Holcomb et al. | |
| 2013/0077501 A1 | 3/2013 | Krishnaswamy et al. | |
| 2013/0252558 A1 | 9/2013 | Nieto | |
| 2014/0250486 A1 | 9/2014 | Sze et al. | |
| 2015/0057044 A1 | 2/2015 | Altman | |

FOREIGN PATENT DOCUMENTS

| | | |
|---|---|---|
| CA | 2842098 A1 | 1/2012 |
| EP | 1748655 A2 | 1/2007 |
| EP | 2273715 A2 | 1/2011 |
| WO | 2012006744 A1 | 1/2012 |
| WO | 2012099762 A1 | 7/2012 |

OTHER PUBLICATIONS

Chi-Yuan, H. et al., "Rate Control for Robust Video Transmission Over Burst-Error Wireless Channels", IEEE Journal on Selected Areas in Communications, May 1, 1999, vol. No. 17, Issue No. 5.

ZACCO European Patent Denmark NS, Application Response No. dated 10168544.4 Apr. 23, 2012 regarding extended European search report, submitted on European Patent Application No. 10168544.4.

European Patent Office, Communication pursuant to Article 94(3) EPC dated May 24, 2012, issued on European Patent Application No. 10168544.4.

Nguyen, T. et al., "Multiple Sender Distributed Video Streaming", IEEE Transactions on Multimedia, Apr. 1, 2004, vol. No. 6, Issue No. 2, pp. 315-326.

ZACCO Denmark NS, Response dated Nov. 30, 2012 regarding the Communication pursuant to Article 94(3) EPC, submitted on European Patent Application No. 10168544.4.

European Patent Office, Communication pursuant to Article 94(3) EPC dated Sep. 24, 2013 submitted on European Patent Application No. 1016544.4.

ZACCO Denmark NS, Response to the Communication pursuant to Article 94(3) EPC filed Apr. 1, 2014 submitted on European Patent Application No. 10168544.4.

Yang Lui; Rui Zhou; Huijuan Cui; Kun Tang; "Bi-Directional Entire Frame Recovery in MDC Video Streaming"; Communications and Information Technology, 2005. International Symposium; IEEE International Symposium, Oct. 12-14, 2005; pp. 1023-1026; v2; Beijing, China.

Van Dyck, R.E., Miller, D.J., "Transport of Wireless Video Using Separate, Concatenated, and Joint Source-Channel Coding"; IEEE Journal magazine; Oct. 1999; pp. 1734-1750; v.87 i10, PA, USA.

Manish Jain, Dovrolis, Constantine; "Path Selection using Available Bandwidth Estimate on in Overlay-based Video Streaming"; Computer Networks, Aug. 22, 2008, pp. 2411-2418, v.52 i. 12, Telchemy Inc., U.S.A.

Toufik, A, et al., "P2P Object-based Adaptive Multimedia Streaming (POEMS)"; Journal of Network and Systems Management, Sep. 2007, pp. 289 to 310, v. 15, n. 3, Springer, New York, NY USA.

Martini, M. et al., "Content Adaptive Network Aware Joint Optimization of Wireless Video Transmission", Communications Magazine, IEEE, Jan. 2007, pp. 84 to 90, v. 45, i. 1, Toronto, Ontario, Canada.

Batra, Pankaj; Chang, Shih-Fu; "Effective Algorithms for Video Transmission over Wireless Channels" Signal processing. Image communication, V 12, Issue 12, Apr. 1998, pp. 147-166 Elsevier, Amsterdam.

(56) References Cited

OTHER PUBLICATIONS

Budagavi, M.; Gibson, J.D. "Multiframe Video Coding for Improved Performance over Wireless Channels" Image Processing, IEEE Transactions, v. 10, Issue 2, Feb. 2001 pp. 252-265, Dallas Texas USA.

Zhang, Q. et al., "Network Adaptive Scalable Video Streaming Over 3G Wireless Network", Image Proceedings, 2001 International Conference Oct. 7-10, 2001, v. 3, pp. 579-582, Thessaloniki, Greece.

Wang, T. et al., "Low-Delay and Error-Robust Wireless Video Transmission for Video Communications", IEEE Transactions on Circuits and Systems for Video Technology, v. 12, issue 12, Dec. 2002, pp. 1049-1058, New York, NY, USA.

Tesanovic, Milos; Bull, David R.; Doufexi, Angela; Nix, Andrew, "Enhanced MIMO Wireless Video Communication using Multiple-Description Coding", Image Communication, v.23, issue 4, Apr. 2008, pp. 325-336, New York, NY, USA.

European Office Action issued in European Application No. 15178347.9 dated May 24, 2017.

United States Office Action issued in U.S. Appl. No. 14/680,476 dated Oct. 18, 2016.

United States Patent and Trademark Office, Office Action dated Oct. 12, 2011, issued on U.S. Appl. No. 12/499,151.

United States Patent and Trademark Office, Office Action dated May 22, 2012, issued on U.S. Appl. No. 12/499,151.

United States Patent and Trademark Office, Office Action dated Dec. 21, 2012, issued on U.S. Appl. No. 12/499,151.

United States Patent and Trademark Office, Office Action dated Jun. 21, 2013, issued on U.S. Appl. No. 12/499,151.

United States Patent and Trademark Office, Office Action dated Jan. 16, 2014, issued on U.S. Appl. No. 12/499,151.

IP Australia, Office Action dated Aug. 4, 2014, issued on Australian Patent Application No. 2010202903.

USPTO, Office Action for U.S. Appl. No. 14/815,363 dated Jan. 11, 2017.

European Patent Office, Office Action dated Oct. 17, 2014, issued on European Patent Application No. 10168544.4.

United States Patent and Trademark Office, Office Action dated Nov. 2, 2015, issued in U.S. Appl. No. 13/439,352.

European PA Tent Office, extended European Search Report dated Oct. 29, 2015, issued in European Patent Application No. 13775296.0.

International Searching Authority, International Search Report and Written Opinion dated Oct. 30, 2015, in International Application No. PCT/CA2015/000448.

European Patent Office, Extended European Search Report dated Dec. 16, 2015, issued in European Patent Application No. 15178347.9.

United States Patent and Trademark Office, Office Action dated May 26, 2016, issued in U.S. Appl. No. 13/439,352.

European Patent Office, European Search Report for EU Application No. 16164092.5 dated Aug. 22, 2016.

Canadian Office Action issued in Canadian Application No. 2671266, dated Nov. 2, 2011.

Canadian Office Action issued in Canadian Application No. 2897772, dated Aug. 19, 2021.

European Office Action issued in European Application No. 15178347, dated Dec. 12, 2016.

Extended European Search Report issued in European Application No. 19188689, dated Sep. 19, 2019.

\* cited by examiner

MULTIPATH DATA STREAMING OVER MULTIPLE NETWORKS

CROSS-REFERENCE TO RELATED APPLICATIONS

This application is a continuation of U.S. patent application Ser. No. 16/655,677 filed on Oct. 17, 2019, which is a continuation of U.S. application Ser. No. 16/024,341 (now U.S. patent Ser. No. 10/547,656), filed on Jun. 29, 2018, entitled "MULTIPATH DATA STREAMING OVER MULTIPLE WIRELESS NETWORKS", which is a continuation of U.S. patent application Ser. No. 14/341,057 (now U.S. patent Ser. No. 10/033,779) filed on Jul. 25, 2014. entitled "MULTIPATH DATA STREAMING OVER MULTIPLE WIRELESS NETWORKS", which is a continuation-in-part of U.S. patent application Ser. No. 12/499,151 (now U.S. Pat. No. 8,873,560) filed Jul. 8, 2009, entitled "Multipath video streaming over a wireless network". The contents of these applications are hereby incorporated by reference in their entirety.

FIELD OF THE INVENTION

Embodiments described herein relate to multipath data streaming over one or more connected networks, and in particular to multipath audio/video data streaming over one or more connected networks in real time.

BACKGROUND

Delivery of large quantities of continuous real-time data from a mobile transmitter to a receiver is a complex problem. The receiver may be located anywhere and connected thereto via one or more connected wireless networks. The data stream may be compressed and transmitted over one or more wireless links before arriving at a server where the operation is reversed, and the data stream recreated. Delivery of large quantities of continuous real-time data may be apparent in the field of live news gathering, for example, where timely delivery of a story to the studio in a broadcast quality format may be critical for success.

Existing technologies such as satellite or microwave fixed link may return a (live) video stream to a studio, but may have shortcomings. For example, satellite or microwave fixed link may take extra time to set up, may be expensive, and once set up may be difficult to be mobile. These solutions may have dedicated channels and a fixed bandwidth that prevents stream failure; however, sporadic dropouts due to weather/catastrophic failure are still possible, but may be infrequent.

Cellular data is a possible alternate mechanism to satellite or microwave for sending data from a mobile transmitter. Cellular data is generally available, available while mobile, and relatively inexpensive. Cellular data may also be relatively low bandwidth, prone to transmission errors and lag due to resource contention, and may be subject to increased interference while moving.

A live audio/video stream has certain characteristics that make it unique, especially when compared with general data (e.g. web browsing data), stored audio/video data (e.g. content stored on a site such as a YouTube™ or Netflix™).

Stored audio/video solutions typically have the ability to buffer data at the start of stream playback, or at any time during playback if the required frames have not yet arrived. Initially, the player stores enough frames from the stream in a buffer to prevent video loss. If the stream is interrupted, the player is able to continue playing from the buffer, assuming that when the stream is restored, the frames will catch up and the buffer will be refilled. If the buffer empties, the player stops and displays the 'buffering' message while waiting for more data. In some circumstances, particularly where the available bandwidth is not sufficient to maintain the stream the result is a 'stutter' effect where the output repeatedly stops and starts.

For some industries such as broadcast, stopping to refill a buffer in the middle of a live audio/video stream may not be acceptable. If the receiver pauses to refill the buffer, the glass-to-glass latency, as defined herein, increases.

Professional live broadcast video is real-time with a requirement for fixed glass-to-glass latency. This is required because the producer of the live broadcast will typically have the sequence of events choreographed, so any change in the glass-to-glass latency would affect the timing of all other events. A fixed glass-to-glass latency means that the response to a video frame that is not delivered on time is to skip it rather than pause the stream to wait for it to arrive. Due to the way video compression works, the loss of even a single video frame may significantly impact the ability of a system to decompress the stream. This is because the most efficient video compression implementations only encode the differences between video frames to minimize the volume of data. As a result, the loss of a single frame of video at the receiver can have significant effects on the reconstructed stream, ranging from persistent video artifacts, black screen, to even complete decompression failure until the next Group of Pictures ("GOP", defined herein) begin.

One solution to the loss of frames may be to choose a glass-to-glass latency that is large enough to absorb any expected network interruptions. For example, a 30 second glass-to-glass latency means there would be close to 30 seconds available to retransmit missing or incomplete frames. For situations requiring a shorter glass-to-glass latency, such as a live interview, this solution may not be feasible. Crucially, in some industries, even delays of seconds can make a video stream unusable or irrelevant. Adding an extended delay to the beginning of a stream, which may still have output errors due to transmission delay, is not feasible for these industries.

Transmitting broadcast quality live video in real time over cellular wireless networks is difficult. There are many wireless capable devices, even some using the latest network technologies (such as Long Term Evolution or LTE for example), that are physically capable of transmitting at the bitrates required for video for short periods. However, the devices may fail when required to reliably transmit a live video stream in real time. The failure may be caused by many uncontrolled variables, such as from physical objects causing interference, the weather, the contention that occurs when multiple devices share the same limited network resources, and so on.

In the world of large quantity time critical data, some solutions are focused on delivery of data transmissions to wireless receivers, but not from wireless transmitters. Cellular network technology implementations may be configured to prioritize delivery of data to a mobile device. As a result, the down channel (e.g. from the wireless network to the mobile device) typically has far more available bandwidth than the up channel (from the mobile device to the wireless network). This may be a worst case scenario for a mobile device that is generating and attempting to transmit the volume of audio/video data required to send broadcast video.

In the field of data communications, multiple data channels may be used to augment data throughput and solve some problem of delivering reliable, high quality data transmissions, such as video data. The paper "Distributed Video Streaming with Forward Error Correction", by Thinh Nguyen and Avideh Zakhor proposes one such method. An approach known in this field includes opening multiple paths and adjusting data rates based on the throughput actually reaching the receiver. This approach typically focuses on extremely specific calculations to maximize efficiency and Forward Error Correction (FEC) through a control channel to adjust the data rates per channel. These types of solutions generally fail over wireless network topologies as a result of the many anomalies that abound in a wireless medium, which may cause sudden and dramatic changes in latency and throughput. Moving wireless transmitters experience problems such as dynamic fading, dead zones, dramatic latency differences, echo effects, the ability to receive but not transmit data, RF interference, immediate channel loss, and channel re-allocation to voice cell phone users.

There exists a need for improved systems and methods for transmitting or streaming large volume audio/video data transmission (from a mobile device) over one or more wireless networks in real time.

There exists a need for systems and methods that address at least some of the challenges and problems associated with maintaining consistent data reception quality when faced with the anomalies of delivering audio/video data stream from a stationary or moving mobile wireless transmitter in real time or near real time.

SUMMARY

In one aspect of an embodiment, a system for transmitting large volumes of source data over a plurality of networks is disclosed. The system may comprise a buffer management and transport controller configured to divide an encoded data stream into a plurality of data packets for buffering into multiple transport buffers; and a plurality of interface modules configured to wirelessly transmit the plurality of data packets to the plurality of networks to aggregate throughput across the plurality of networks, wherein the plurality of modules are further configured to provide connectivity conditions to the buffer management and transport controller regarding the plurality of networks, wherein the plurality of networks are operated by two or more network carriers; and wherein the buffer management and transport controller is further configured to process the connectivity condition to: for a data packet of the plurality of data packets and prior to a transmission of the data packet, withdraw the data packet from a transport buffer of the multiple transport buffers and select a module for the transmission of the data packet over at least one of the plurality of networks.

In another aspect, the system may comprise a data transmission control and reassembly module configured to receive the plurality of data packets from the plurality of wireless networks for reassembly.

In another aspect, the data transmission control and reassembly module may be configured to provide receiver feedback to the buffer management and transport controller regarding additional wireless connectivity conditions for the plurality of wireless networks, and the buffer management and transport controller may be further configured to process the receiver feedback to select the radio frequency module for the transmission of the data packet.

In yet another aspect, the buffer management and transport controller may be configured to match an input rate for the plurality of data packets with a withdraw rate for the plurality of data packets at a transport buffer of the multiple transport buffers using the wireless connectivity conditions.

In one aspect, the wireless connectivity condition may comprise one-way network latency, and the one-way network latency may comprise a delay between when a data packet is transmitted and when the data packet is received.

In another aspect, at least one radio frequency interface modules of the plurality of radio frequency interface modules may concurrently maintain multiple network connections to the plurality of wireless networks.

In yet another aspect, the transport controller may be further configured, using the received wireless connectivity conditions, to dynamically and selectively redirect a data packet of the plurality of data packets from one radio frequency interface module to another radio frequency interface module of the plurality of radio frequency interface modules, and from one available wireless network to another available wireless network of the plurality of wireless networks, whereby data throughput to a destination receiver is maintained.

In still another aspect, the source data may be transmitted in real-time with a constant delay.

In one aspect, the system may comprise a data source configured to capture a continuous real-time stream of audio-video data for the encoded data stream.

In another aspect, the wireless connectivity conditions may comprise information relating to: an error rate for each of the plurality of radio frequency interface modules based on the assembled packets that are not delivered at the destination for re-assembly; and a capacity condition for each of the plurality of radio frequency interface modules based on the assembled packets that are delivered at the destination for re-assembly.

In another aspect, the buffer management and transport controller may be configured to control: delivery of each data packet of the plurality of data packets from a transport buffer of the multiple transport buffers to a corresponding radio frequency interface module of the plurality of radio frequency interface modules; and transmission, for re-assembly at a destination, of each data packet of the plurality of data packets from the plurality of radio frequency interface modules for wireless transmission over one of the plurality of wireless networks.

In yet another aspect, the buffer management and transport controller may be configured to use the received wireless connectivity conditions to control at least one of the quantity and the quality of the captured continuous real-time stream.

In still another aspect, the buffer management and transport controller may be further configured to route redundant packets to the plurality of radio frequency modules for increased transmission reliability.

In one aspect, the wireless connectivity conditions may be selected from the group consisting of: one-way network latency, glass-to-glass latency, transmit collisions at one or more said simultaneously available different wireless networks; the number of the modules in the wireless radio transmission with each said simultaneously available different wireless network; throughput requirements of the plurality of modules for the wireless radio transmission on each said simultaneously available different wireless network; coverage drop-off indicators; time between successful transmission attempts; status values; Received Signal Strength Indicator (RSSI); packet retransmissions; average packet loss per link; sender bandwidth; destination bandwidth; current available bandwidth; and combinations thereof.

In another aspect, the buffer management and transport controller may be further configured, using the wireless connectivity conditions, to control a transmission rate of data packets to a corresponding radio frequency interface module of the plurality of radio frequency interface modules from the multiple transport buffers.

In another aspect, at least one of the plurality of radio frequency interface modules may be configured to apply congestion control to establish and maintain a transmission rate of data packets.

In yet another aspect, the at least one of the plurality of radio frequency interface modules may be configured to apply congestion control by determining a congestion avoidance threshold.

In still another aspect, an initial value of the congestion avoidance threshold may be determined as a function of a measured transmission rate.

In another aspect, a target transmission rate may be determined based on at least one of the congestion avoidance threshold and a measured transmission latency.

In one aspect, the congestion avoidance threshold may be increased when a measured transmission latency is within a pre-defined range.

In another aspect, the at least one of the plurality of radio frequency interface modules may be configured to transmit data packets at the target transmission rate.

In another aspect, the plurality of radio frequency interface modules may be configured to transmit the plurality of data packets to the plurality of wireless networks simultaneously or near simultaneously.

In still another aspect, each of the plurality of wireless networks may have disparate network characteristics or conditions.

In one aspect of an embodiment, a method for transmitting large volumes of source data over a plurality of wireless networks is disclosed, the method may comprise: dividing an encoded data stream into a plurality of data packets; buffering the plurality of data packets into multiple transport buffers; determining wireless connectivity conditions regarding the plurality of wireless networks, wherein the plurality of wireless networks are operated by two or more network carriers; wirelessly transmitting the plurality of data packets to the plurality of wireless networks to aggregate throughput across the plurality of wireless networks; and processing the wireless connectivity condition to: for a data packet of the plurality of data packets and prior to a transmission of the data packet, withdraw the data packet from a transport buffer of the multiple transport buffers and dynamically select a radio frequency module for the transmission of the data packet over at least one of the plurality of wireless networks.

In another aspect, the method may comprise receiving the plurality of data packets from the plurality of wireless networks for reassembly.

In another aspect, the method may comprise receiving receiver feedback regarding additional wireless connectivity conditions for the plurality of wireless networks, and further processing the receiver feedback to select the radio frequency module for the transmission of the data packet.

In yet another aspect, the wireless transmitting may comprise concurrently maintaining network connections to the plurality of wireless networks.

In still another aspect, the plurality of data packets may be transmitted such that source data is transmitted in real-time with a constant delay.

In one aspect, the method may comprise capturing a continuous real-time stream of audio-video data, and encoding the captured stream of audio-video data to form the encoded data stream.

In another aspect, said wirelessly transmitting may comprise applying congestion control to establish and maintain a transmission rate of data packets.

BRIEF DESCRIPTION OF DRAWINGS

Various embodiments will now be described, by way of example only, with reference to the following drawings, in which.

Figure 1:
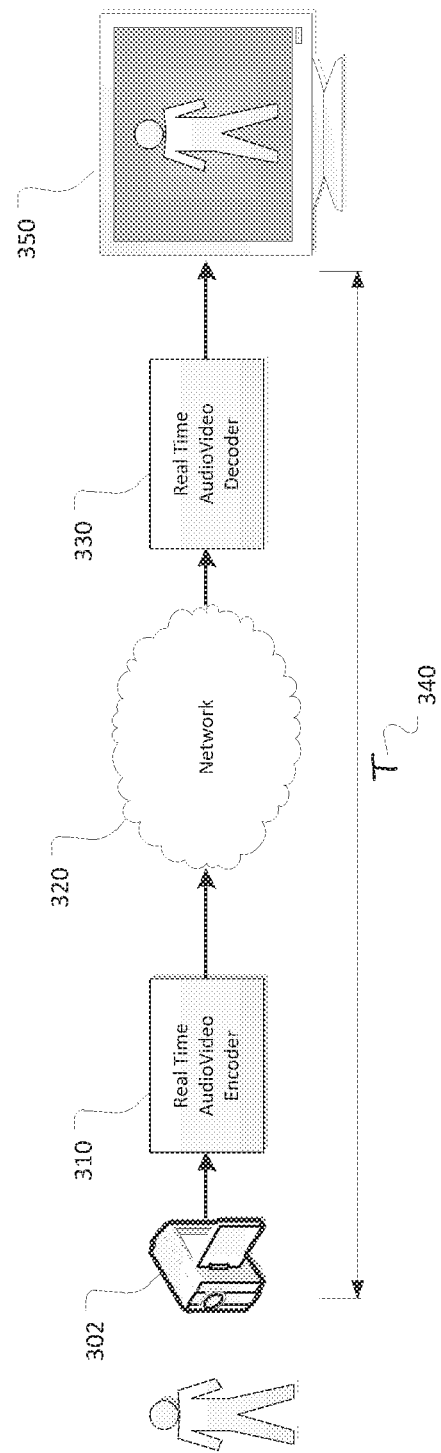
FIG. 1 is a block diagram presenting an overview of an exemplary system for transmitting audio and video data in real time or near real time.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

DETAILED DESCRIPTION

Definitions

The terms used throughout this specification generally have their ordinary meanings in the art, within the context of the present disclosure, and in the specific context where each term is used. Further, certain terms are defined in this section, or elsewhere in the specification, to provide additional guidance to the reader.

Glass-to-glass Latency (G2G Latency) as used herein may refer to the time delay between the time of capture of a data source (e.g. at the glass of the camera lens) using a data capture device or equipment and the time of delivery of the reassembled data stream to the intended receiver, such as a data transmission control and reassembly module as described herein. In the simplest case, the receiver could be a directly connected video output.

Network Latency as used herein may refer to the time from when a packet of data is delivered to a Radio Frequency (RF) interface until that same packet of data arrives at a receiver after passing through the connected network(s). This is the one-way time period that a single packet requires to traverse the connected (wireless) network(s), from the transmitter to the receiver.

Broadcast Quality as used herein refers to a minimum standard of quality that the network producers will accept. Video meeting this standard is real-time (constant delay), has a minimal glass-to-glass latency (<1 sec), and no errors in output due to lost frames.

A Connected Network as used herein may refer to network infrastructure which communicates with an RF interface on a data capture device (e.g. mobile unit) and acts as a gateway to another network, such as the wider Internet, passing data to a designated receiver. Different carriers may operate one or more networks.

A Data Stream as used herein may refer to the continuous delivery of information or data signals, from a data source, to be passed to a receiver. The data source for the data stream may be generated by a data capture device. In the case of an audio or video data stream, the information is typically composed of discrete units known as frames.

A Video Frame may represent a single image in a series of images required to reconstruct a moving picture.

An Audio Frame may be a discrete segment of a continuous audio data stream. Embodiments described herein may divide a continuous audio data stream into a stream of fixed length segments, each of which may represent a slice of time. Played back in sequence, the audio frames can comprise the entire audio data stream.

A Video Stream or Video Data Stream may refer to a continuous sequence of video frames, typically presented at one of the industry standard frequencies. For instance, the standard NTSC requires frames to be delivered at 29.97 frames/second. A video stream may or may not include an audio stream. Embodiments described herein may divide a continuous video data stream into a stream of fixed length segments, each of which may represent a slice of time.

A Group of Pictures or GOP is a term from video compression terminology. A GOP may refer to a set of image frames characterized by a lead reference frame followed by one or more incremental reference frames. Typically, the lead frame (I Frame) is significantly larger than the following reference frames (P Frames or B Frames) since the reference frames describe only the changes from a previous frame (in the case of a P Frame) or an upcoming frame (in the case of a B Frame).

Real-Time Delivery of Data as used herein may refer to a data stream that is output from the receiver (after reassembly of received data packets) at the same rate, and at almost the same instant as it was captured from the source. There may not be a true instantaneous output of data after transport across the one (or more) connected wireless networks, so real time as used herein may refer to delayed real-time or near real-time. Embodiments described herein may provide a real time solution that may add a fixed length delay between capture and subsequent play back. The delay is constant and as short as possible. The delay may be less than one second, though longer may be required depending on the connectivity available. This delay may also be referred to as the Glass-to-glass latency, as defined previously.

Buffering as used herein may refer to the process of pausing a received stream of audio/video data until the receiver has enough of a reserve of the stream to allow for brief pauses in the delivery of content without affecting the output. A typical streaming solution may pause to buffer the incoming stream at the beginning of play back, and whenever the reserve empties. For delayed real time solutions, buffering may only occur initially, when the stream is first started, any subsequent occurrences increase the glass-to-glass delay and may cause the output to fail catastrophically. Embodiments described herein may match the rate of data going into the buffer with the rate of data being taken from the buffer based on received feedback regarding network conditions. The control of the input rate to the output rate may be determined using the received feedback regarding network conditions.

Lost Packets as used herein may refer to data packets that are not delivered to the receiver in time for reassembly into the audio or video frame, when that frame is required for play out. In a system with forward error correction, redundant data within the stream of data packets may allow for a limited number of packets to be lost without consequence. In the case where too many packets are lost, the frame cannot be reconstructed and is subsequently lost, causing an error in the receiver output. There may be no capacity for delay beyond that built into the Glass-to-glass latency. If a packet is not delivered on time, it is considered lost and the frame of which it is a component may not be reconstructed.

Lost Frames as used herein are frames of audio or video data which could not be reconstructed in time for output at the receiver as scheduled within the fixed G2G latency. Lost Packets, as defined above, may result in a frame being corrupted and therefore lost. This is not always the case as lost packets which are detected in time may be recovered. A lost frame can results in an error in the reassembled output stream.

Wireless Connectivity Conditions, Network Conditions, or Feedback as used herein may refer to information received from different modules, components and sources regarding network performance for transmission and reception of data packets. The feedback may be received from components involved in the transmission of the data stream and components involved in receiving the transmitted data stream. Feedback may also be inferred by observation of components which are not directly available for measurement. Example wireless connectivity or network conditions include (but are not limited to): network latency (e.g. instantaneous or aggregated latency), packet loss, sender bandwidth or transmitted bandwidth, receiver bandwidth or received bandwidth, metrics specific to wireless links (e.g. RSSI, RSCP, EC/IO, CQI), and RF Interface (modem) buffer fullness. Feedback encompasses instantaneous and various statistically filtered versions of the aforementioned variables, as well as derivative measurements such as rates of change and statistical correlation between any of these variables.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the embodiments described herein may provide improved transfer of audio/video data through one or more connected wireless networks in real time, with a fixed glass-to-glass latency. Embodiments described herein may further provide transfer of audio/video data in real time by routing on a data packet basis over multiple network connections (e.g. different networks, networks provided by multiple carriers) simultaneously to maximize throughput. The routing on a data packet basis may be based on feedback received from receivers and radio frequency modules. A routing decision for a given data packet may be made before transmitting the data packet based on the received feedback.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Overview

Transmitting live video in real-time over disparate connected networks is often difficult. Disclosed herein are various embodiments of methods and systems for the real-time (or near real time) transmission of high volume, time critical data over wireless networks. The embodiments may include at least one of the following concepts:
  Data streams in real time or near real time. In the case of (broadcast) audio/video, this may require a guaranteed glass-to-glass latency traded off with a variable quality.
  Multiple shared networks operated by multiple carriers. The design may use a multi-network bonded transport to select the best path for a given data packet at a given time.
  Wireless networks may be shared. There may be competition for shared wireless network resources between other data applications and voice calls. Connection congestion can be detected and mitigated.

Advantageous Effects

A real time video stream is extremely sensitive to any delivery delay experienced by the transmitted data packets. The glass-to-glass latency must be set large enough to accommodate the expected network latency, otherwise data packets may not arrive in time for reassembly which may, in turn, cause errors and undesirable display effects in the output stream. The glass-to-glass latency is typically not allowed to vary once a stream has started transmission.

Embodiments described herein may combine multiple wireless or other forms of communication channels, which may resolve technical issues with cellular data, while increasing the speed and reliability.

Embodiments described herein relate to the transfer of audio/video data through one or more connected wireless networks in real time, with a fixed glass-to-glass latency. The wireless networks may be provided or serviced by different network carriers.

Embodiments described herein may further relate to the transfer of audio/video data in real time by routing on a data packet basis over multiple connections simultaneously to maximize throughput.

Embodiments described herein may provide improved transfer of audio/video data through one or more connected wireless networks in real time, with a fixed glass-to-glass latency.

Audio/video data, when represented as a digital data stream, require large amounts of bandwidth to send an acceptable output to the destination receiver. This bandwidth requirement is capable of overwhelming most available wireless communications channels. Further, the challenges increase when faced with the anomalies that arise when the transmitter is in motion, or when there are other devices contending for the same scarce wireless resources, or other environmental conditions cause the wireless connection to slow or even fail.

Embodiments described herein may further relate to receiving feedback from system components (e.g. radio frequency modules, receivers), such as for example, feedback on network latency, to optimize usage and throughput of one or more connected wireless networks in real time. The feedback may be used to make routing decisions before transmitting data packets.

A data stream may be delivered on a best effort basis, with a consistent delay between data capture at the source and data play back at the receiver. There may be no provision for buffering as the output is typically played back in real time. Frames which cannot be recreated in time may be dropped, causing a display error in the output stream. Video errors may result in screen distortions or a completely black screen. Both conditions are typically unacceptable to industries which use data capture and playback equipment.

Embodiments described herein may implement real-time measures to manage the display error rate. As will be described herein, a data stream may be divided into multiple segments, which may be referred to as data packets. The data packets may be reassembled at the receiver.

Embodiments described herein may implement real-time measures for transmitting data streams by routing on a per data packet basis based on feedback conditions received from transmission related components (e.g. radio frequency modules) and receiver related components.

Embodiments described herein may provide systems and methods to handle circumstances when the connected network parameters (network latency, error rate, bandwidth, and so on) for one or more networks vary unpredictably, either due to transmitter motion, resource contention or other environmental conditions. The variations in network parameters may be monitored via feedback received from transmission related components (e.g. radio frequency modules) and receiver related components.

A real time video stream can be extremely sensitive to any variability in the delivery delay experienced by the transmitted data packets. The glass-to-glass latency must be set large enough to accommodate the expected network latency, otherwise data packets may not arrive in time for reassembly which may, in turn, cause errors and undesirable display effects in the output stream.

After compression, video frames may still be too large to be transmitted over wireless networks without splitting them into smaller pieces (fragments). In the standard OSI network model, fragmentation typically occurs transparently at the network layer (e.g. the IP layer in standard TCP/IP networks). The embodiments described herein seek to avoid transparent fragmentation at the IP layer in order to increase efficiency. Transparent fragmentation at the network layer is sub-optimal for real-time video applications because if one fragment of the original video frame is lost in the network, the fragments that did arrive at the receiver are never delivered to the application, forcing the sender application to retransmit the entire video frame repeatedly until either all fragments arrive successfully, or the frame expires (i.e. is no longer current from a real-time perspective). In the exemplary implementation, explicit fragmentation is used in that the application fragments video frames into data packets before sending them through the network. The fragment size is chosen to be slightly smaller than the standard Internet maximum transmission unit (MTU) size (1500 bytes). This size allows data packets to be transmitted across most connected networks without transparent fragmentation at the network layer. More advanced exemplary implementations use well-known Path MTU discovery algorithms to discover the maximum MTU between the sender and receiver, which may be a different value for each wireless connection available to the sender.

In accordance with some embodiments described herein, routing decisions may be made on a per data packet basis. For example, one data packet associated with a data stream may be routed to a first network, and another data packet associated with the same data stream may be routed to a second (different) network. The networks may be operated by different network carriers. The networks may be the same or different types of networks. The selection of what network to use for transmission of a given data packet can be made before the data packet is sent. The selection may be based on feedback received from transmission related components (e.g. radio frequency modules) and receiver related components.

Embodiments described herein deliver data packets across different wireless networks, which may be different than delivering data packets over different network paths within the same network. For example, embodiments described herein transmit packets over different networks to a set of receivers that accept transfer of packets, while operable to change the rate of packet delivery (based on feedback) selectively from carrier by carrier basis, network by network basis, receiver by receiver basis, or packet by packet basis. Embodiments described herein provide flexible, adaptive, and dynamic tools for data packet transmission.

Embodiments described herein may not require a listing of active base stations for one or more networks, as this may require integration into a particular network and may not be feasible if a network carrier does not cooperate to provide this information. Instead, embodiments described herein transmit different packets over different networks, which may operate separately and by different carriers. Further, different base stations may operate at different frequencies and which make communication between different base stations within the same network and across different networks difficult.

In one exemplary embodiment, a process of capturing video for broadcast is illustrated in FIG. 1. First the video is captured by a camera or similar device 302. The resulting video stream is passed to a real time audio/video encoder 310 where it is compressed and optionally encrypted. The resulting compressed stream is then directed, still in real time, across a communication network 320 to the intended receiver. The communication network may be as simple as a wire between two devices, a fixed/dedicated link, an internal network, the Internet, a fiber network, or a cellular communication network. The intended receiver, for example a real time audio-video Decoder 330, decompresses and decrypts (if required) the video stream. In another embodiment, the intended receiver can also be a data transmission control and reassembly module as described elsewhere in this disclosure. The reconstructed stream is now available for distribution or viewing on a connected monitor 350. An important consideration is the time T 340 required for the captured video to be encoded, transported, and decoded—this is an example of the Glass-to-glass latency as defined above.

Figure 2:
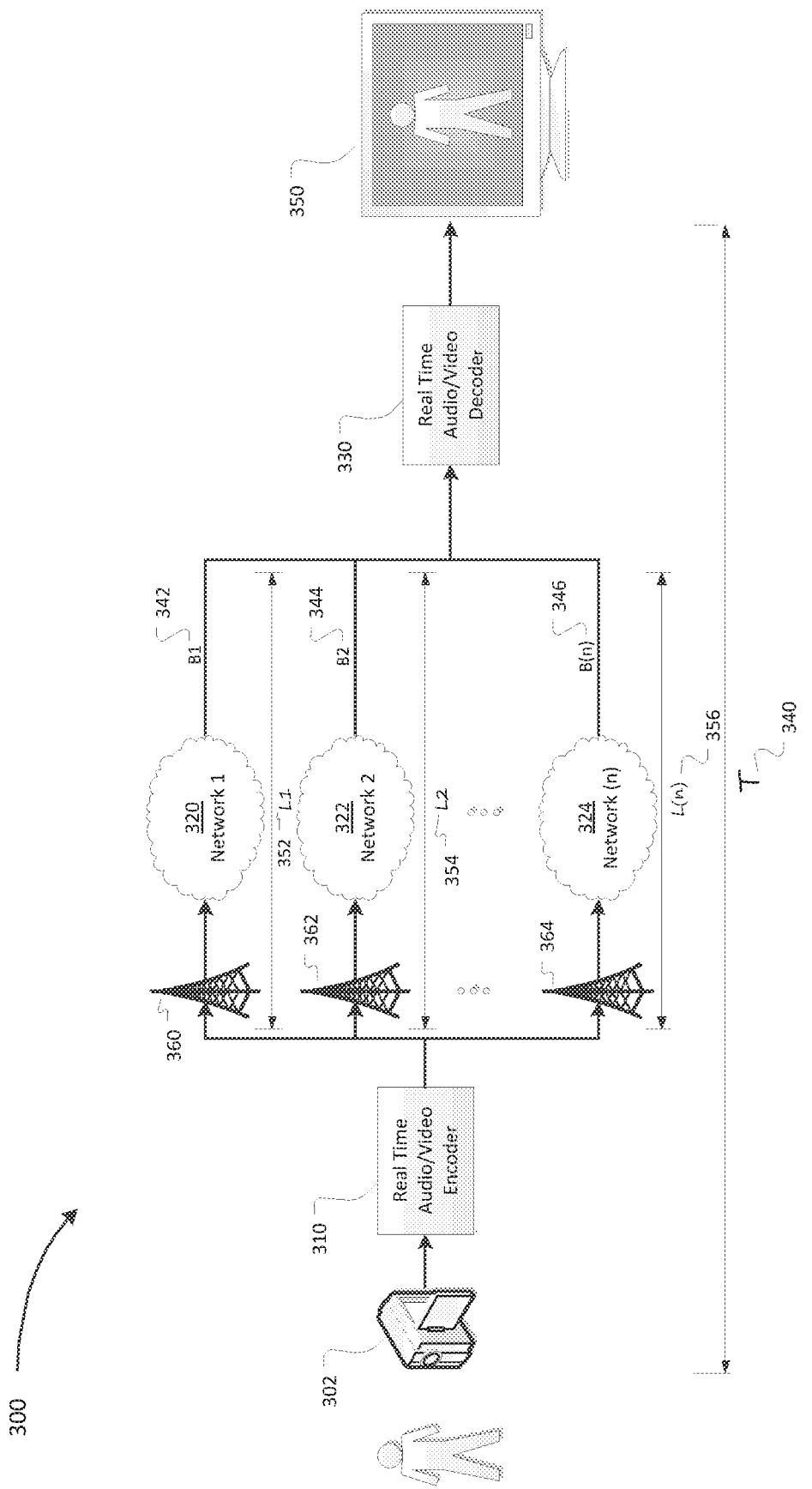
FIG. 2 illustrates an exemplary embodiment of a multipath system spanning one or more wireless networks.

Referring now to FIG. 2, there are further considerations that can be made when the transmission of encoded data stream is done over one or more (wireless) networks 320, 322, 324 to a Decoder 330, as shown in the network system 300. For example, after being encoded and optionally encrypted, the video/audio data stream may be transmitted via multiple radio frequency (RF) interfaces 360, 362, 364 over multiple different wireless networks 320, 322, 324, respectively. Each network can have its own characteristics and conditions, including available bandwidth, network latency, glass-to-glass latency, transmission rate, data packet queue length, input rate, output rate, and so on. So, each network may have disparate characteristics and conditions. Consequently, each network should be treated differently. For example, each network 320, 322, 324 may have an independent bandwidth Bn 342, 344, 346, and a network latency Ln 352, 354, 356. An embodiment may take into account these disparate characteristics to maximize overall throughput while maintaining a constant time T 340.

In some embodiments, all connected networks can be assumed to be a shared resource with access and availability shared with the many connected devices operated by the general public. The mobile device is often unable to control access to the network or define a minimum quality of service. As a result, in one embodiment, variability in each of bandwidth Bn 342, 344, 346, and network latency Ln 352, 354, 356 can be accommodated by, for example, adjusting the quality of the output video stream. Even on communication networks with a defined quality of service, there may exist the possibility of service interruption or delay that the Encoder 310 should account for.

Figure 3:
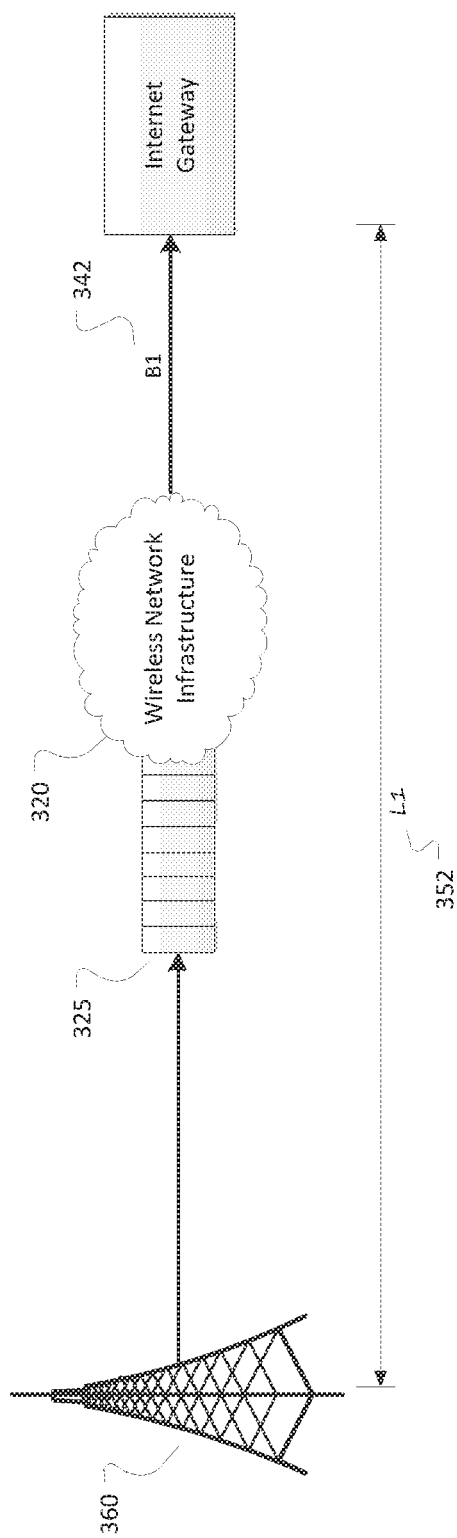
FIG. 3 illustrates an exemplary basic queuing model applicable in a multipath system over one or more wireless networks.

FIG. 3 depicts an exemplary embodiment of one wireless network in FIG. 2. Each communication (wireless) network can have at least two network characteristics: a queue 325 containing data packets received by the network and not yet passed to the Internet gateway, and a rate or bandwidth B1 342—the maximum rate at which the wireless network 320 is able to send data to an Internet gateway.

In another embodiment, one mobile device can continuously transmit source data through wireless network 320. If the rate at which the mobile device sends data packets to the network is greater than the output rate B1 342, then the wireless network can temporarily store packets in the queue 325. As the queue 325 is filled, the measured latency L1 352 increases. The behaviour of the queue can vary depending on the configuration of the wireless network. In some networks, the queue has a limited size or depth. In other networks, the queue can be treated as having infinite depth, and the network latency may grow without bounds. Other networks may have a queue per device, or may have a queue of extremely limited length (resulting in frequently dropped data packets).

On a public network, there are typically multiple devices submitting data for transmission, all sharing the same output rate B1 342. As a result, it is impossible for a mobile device to know exactly how full the queue is or the exact rate or bandwidth available to the mobile device for sending data to the network. Furthermore, the details of the operation and/or state of a communication or wireless network are often not available to the mobile device. An exemplary embodiment may perform statistical analysis on the available feedback (transmit rate, receive rate, instant network latency, averaged network latency, and other parameters) in order to determine the optimal transmission rate or radio frequency for any given interval.

In one embodiment, each RF interface can independently implement a congestion control algorithm to establish and maintain a predictable or an appropriate data transmission rate. The algorithm continuously updates a long term, slow moving estimate for the channel's available bit rate B1 342. This estimate may be referred to as a congestion avoidance threshold (CAThresh).

Traditional congestion control algorithms such as the one used by TCP, follow a pattern known as additive increase, multiplicative decrease (AIMD). When a congestion event occurs, a target transmission rate may be quickly (or multiplicatively) reduced. The target transmission rate may also be known as a target bits per second (Target BPS). When the congestion event disappears, the Target BPS is slowly (or additively) increased. As described herein, in one embodiment, a novel congestion control algorithm comprises at least two differences from the traditional methods: 1) instead of arbitrary multiplicative decreases of a target transmission rate (or a Target BPS) in response to congestion, decreases are kept as a function of bits per second as reported by the receiver (Received BPS); and 2) multiplicative or quick increases of Target BPS are allowed if the current Target BPS is below CAThresh (the current estimate for B1 200). The receiver here may be a decoder or a data transmission control and reassembly module.

In one embodiment, an initial value for CAThresh can be determined by increasing the transmitted instantaneous bits per second (Target BPS) until there is a definitive positive correlation between the increasing transmission rate (Target BPS) and the measured network latency L1 352. Correlation indicates that the queue 325 is being filled, indicating the channel's available bit or bandwidth rate B1 342 has been reached or surpassed. Once this correlation is determined/observed, the initial value of the congestion avoidance threshold can be determined as a function of the measured data transmission rate (Received BPS) reported by the receiver, such as a data transmission control and reassembly module. The function ensures the initial value of CAThresh is below B1 342 (which is at least the value of Received BPS).

Immediately after the initial value for CAThresh is determined, the Target BPS is set to a value slightly below CAThresh, allowing queue 325 to be drained, which reduces the measured network latency L1 352. Once the latency has stabilized, Target BPS is increased multiplicatively as long as it remains below CAThresh and latency L1 352 does not increase, meaning queue 325 is not being filled. In addition, if latency starts to increase while the target bit rate BPS is below CAThresh, the Target BPS can be decreased by a function of Received BPS and reduce the CAThresh accordingly.

When the target bit rate BPS is equal to CAThresh, both are increased slowly (additively) as long as the network latency remains in an acceptable (pre-defined) range (and is not positively correlated with the increased bit rate). The algorithm is probing for more available bandwidth, in case the available bit rate B1 342 has increased. Once a positive correlation is detected, both parameters are again reduced to a value that is a function of Received BPS.

There is an exponential time delay between failed additive increase attempts to prevent repeated/periodic behaviour in the case where CAThresh already equals B1 342.

Increases in network latency L1 352 seen while the channel's Target BPS is less than or equal to CAThresh are assumed to be transient. If the latency increases beyond an acceptable range, the Target BPS is immediately reduced to a value that is a function of Received BPS, and CAThresh is slightly reduced.

If the network latency L1 352 returns to an acceptable level, the Target BPS is allowed to increase quickly (multiplicatively) as long as it is less than CAThresh. This allows the Target BPS to recover quickly toward the channel capacity B1 342 in the case where the latency increase was a transient spike. Once Target BPS reaches CAThresh, the algorithm resumes periodically probing for additional bandwidth.

The congestion control algorithm can also detect when the wireless communication network reduces the available bandwidth B1 342 to a value below CAThresh. If B1 342 has been reduced, each time Target BPS is greater than B1 342, there is a corresponding increase in the network latency L1 352. This triggers an immediate reduction of Target BPS to a value that is a function of the Received BPS, and slightly decreases CAThresh. This process repeats until CAThresh is less than or equal to the new value of B1 342 and the network latency stabilizes. The algorithm then resumes periodic probing for additional bandwidth.

Figure 4:
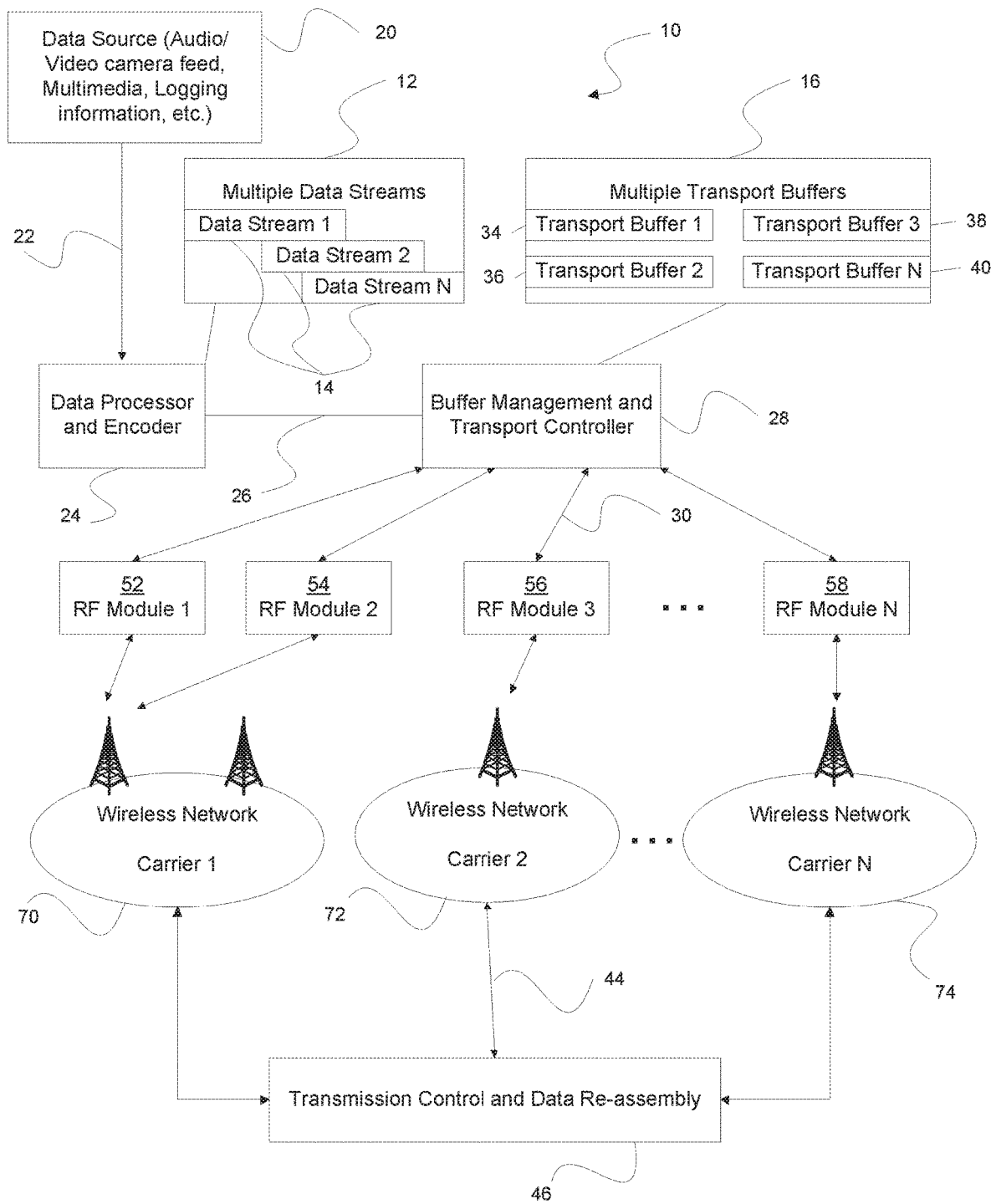
FIG. 4 is a block diagram of an exemplary multipath system with multiple wireless networks according to some embodiments.

FIG. 4 is a block diagram of an exemplary system 10, in one embodiment of the invention, with different wireless networks 70, 72, 74 operated by different carriers. Wireless Networks 70, 72, 74 could include one or more similar wireless network types, or they could all be unique. The wireless networks may be associated with different data transmission rates, and other connectivity conditions. The conditions may be monitored by RF interface modules 52, 54, 56, 58 and data transmission and control re-assembly 46 and used by system 10 as feedback.

Wireless networks 70, 72, 74 may be configured differently across different carriers, and between one geography and another. Embodiments described herein may implement routing techniques for data packets of data streams for transmission over different network configurations and carriers. For example, different networks may have different queuing models and embodiments described herein may be used for different queuing models and without access to detailed information about the underlying queuing models. Access to such information may be difficult and may require cooperation by carrier.

An exemplary use is in environments where there are large quantities of data that must be delivered in real time with a need for mobility and a non-fixed origin or source for the data. An example of this is in the news and broadcasting industry where information may be captured and immediately transmitted to a central studio for broadcast. A common situation includes live action news coverage cameras that are currently connected to satellite trucks costing hundreds of thousands of dollars to build and outfit. These costs are prohibitive for smaller news centers. A cellular-based method is ideally suited for delivering such live news content.

In the exemplary system 10, the Data Source 20 exists for capturing data such as video feeds, audio/video camera feed, multimedia data, and logging. When Data Source 20 is video and audio based it may include normal, high, or extremely high definition audio and video content. When the Data Source 20 is multimedia it may include audio, video, pictures, commands, voice data, television signals and other advanced digital content. Depending on the type of Data Source 20, the data stream 22 may use a coupling technique based on the Data Source 20 type. For example, when the Data Source 20 is audio and video content an analog and digital camera may be used and may follow standard connection methods such as Serial Digital Interface (SDI), composite video interface or firewire (standard IEEE 1394) for example. Although only one data source 20 is shown for simplicity, system 10 may involve multiple data sources 20.

A data stream 22 from Data Source 20 may be directed to a Data Processor and Encoder 24. In an exemplary environment the Data Processor and Encoder 24 contains one or more high power computer processors and additional graphic processing chips for high-speed operation. Depending on the type of data stream 22, content several advanced encoding methods could be used on the data. The encoding methods could include compression techniques, encryption techniques and multiple descriptive encoding (MDC) techniques to name just a few. When the data stream 22 is an audio and video data stream the Data Processor and Encoder 24 encodes the audio and video stream 22 using a standard compression encoding method such as MPEG-4 or the like. For other types of data other compression, encoding or encryption may be used on the data. The compressed and encoded data stream(s) are then delivered to the receiver where the Data Transmission Control and Re-assembly module 46 reconstructs, decompresses and decodes the data stream into its original form.

Audio and video may have different characteristics and as a result may be encoded separately, with different compression mechanisms, each tailored to the data stream type. The encoding process chosen for compressing the video substream may also result in additional streams, for example multiple descriptive coding (MDC). Within the MDC splitting method there are many different algorithms that could be used to achieve the splitting of a single data stream 22 into Multiple Data Streams 12, one such algorithm is called Polyphase Down Sampling. Other types of data splitting algorithms could be used to achieve similar results. An exemplary implementation may use H.264 to encode and compress the video stream into a single data stream. An audio encoder (e.g., mp3) compresses the audio stream.

Figure 12:
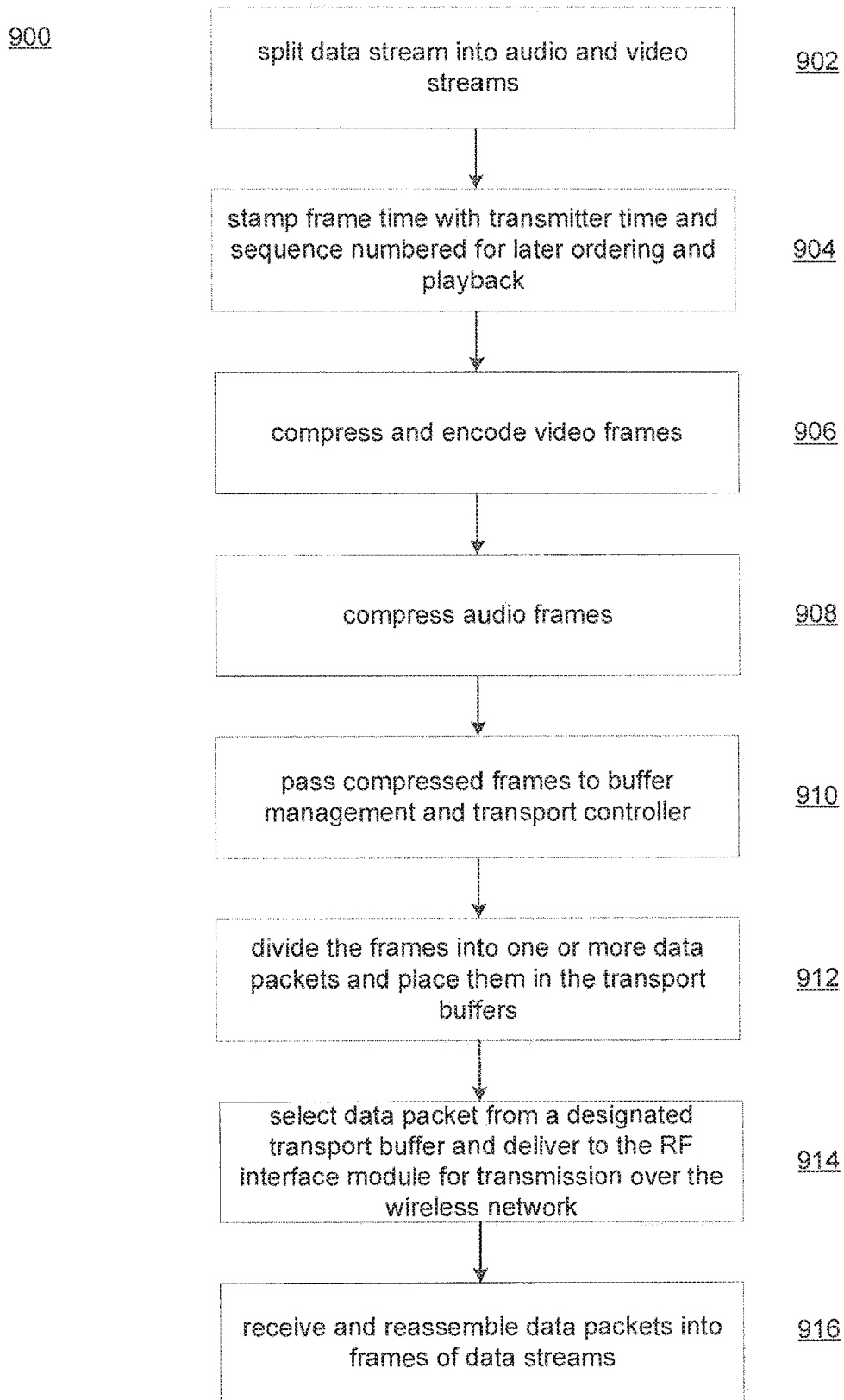
FIG. 12 is a flow chart illustrating an exemplary life cycle of a video/audio frame.

Referring also to FIG. 12 there is shown a flow chart of a method 900 illustrating the life cycle of a video frame.

The Data Processor and Encoder 24 handles the source audio/video data stream in several steps. As noted, the audio/video data stream may be a live, continuous, real-time data stream.

At 902, the data stream may be split into separate audio and video streams. Each stream may be composed of multiple frames. The video stream contains sequential individual images and the audio contains segments of continuous sound.

At 904, each frame is time stamped with a time associated with the transmitter (e.g. transmitter's local time) and sequence numbered for later ordering and playback.

At 906, the video frames may be compressed and encoded with a variable rate compressor, in the case of the exemplary solution, H.264. Other compression and encoding techniques may also be used.

At 908, the audio frames may be compressed using a variable rate compressor such as Opus or a fixed rate compressor such as MP3 or similar technology. Some example implementations may use a slightly less efficient MP3 encoding mechanism. The resulting output is stateless as none of the previous or following frames are required to decode the current frame (as is the case for a compression technology such as AAC). This allows the receiver to lose the occasional audio data packet with a minimal impact on the decoded output. Step 906 and 908 may be interchangeable in order.

At 910, the compressed frames of both streams are passed to the Buffer Management and Transport Controller 28. Although the Buffer Management and Transport Controller 28 is referred to as one component herein it may comprise separate, distinct components.

As shown in FIG. 4, multiple data streams 12 may be fed into the Buffer Management and Transport Controller 28 over a link 26. This link 26 could be a direct link, for example over a computer Bus, a shared memory or other fast internal method or over an external method such as firewire link, a Universal Serial Bus (USB) link, a serial connection, Bluetooth or WiFi wireless link or some other high speed link. In a fully integrated system the Data Processor and Encoder 24 could co-exist with the Buffer Management and Transport Controller 28 in the same physical housing.

Figure 5:
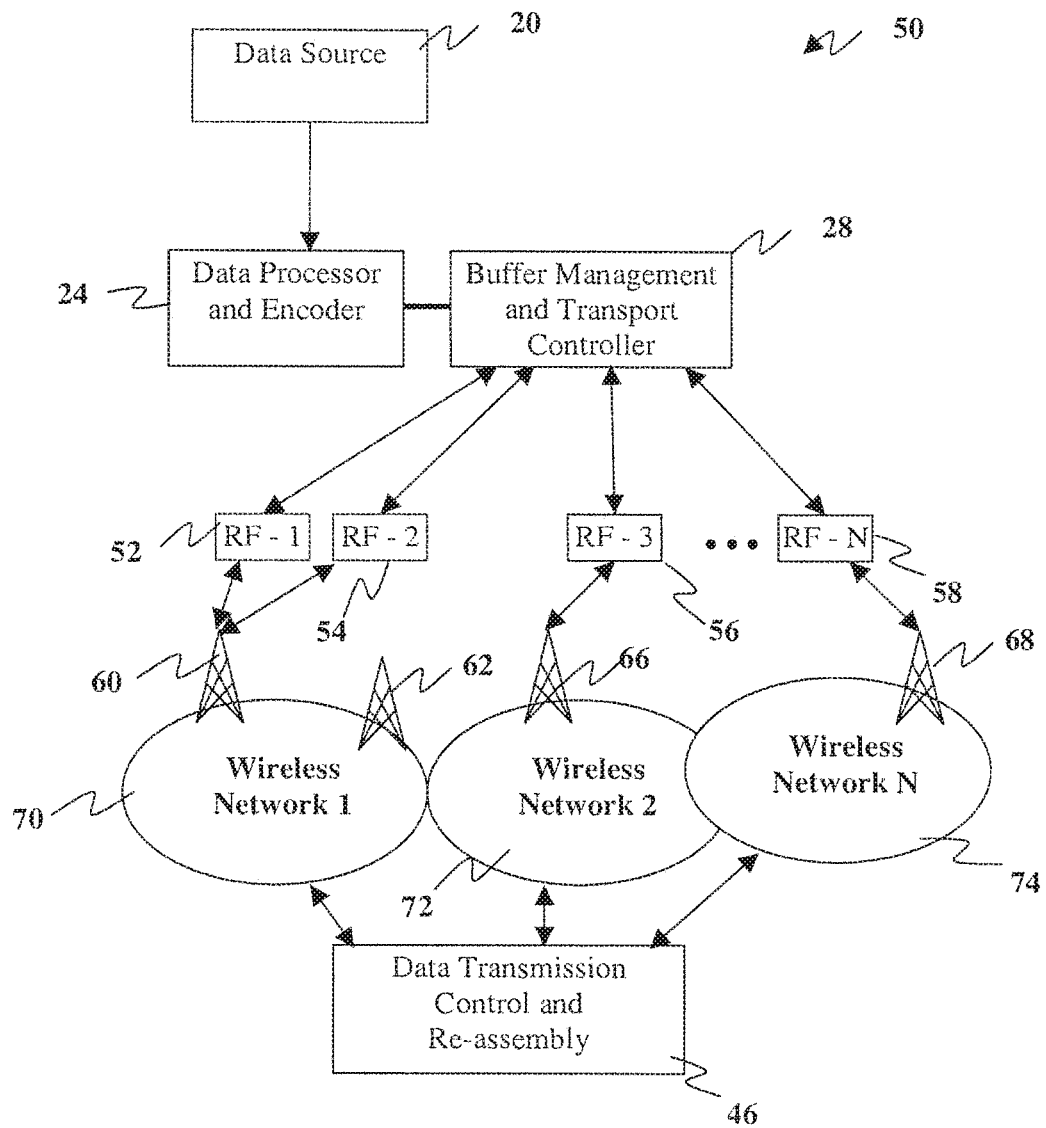
FIG. 5 is a block diagram of an exemplary system with multiple wireless networks according to some embodiments.

The Buffer Management and Transport Controller 28 acts as the main interface to one or more Radio Frequency (RF) interface modules 52, 54, 56, 58 (e.g. RF module). These are coupled by feature 30 to the Buffer Management and Transport Controller 28 using a variety of coupling methods such as Universal Serial Bus (USB), serial link, Personal Memory Card International Association (PCMCIA) or direct motherboard bus connection. In FIG. 4 the RF Interface Modules are illustrated as RF modules 52, 54, 56, 58. As shown in FIGS. 4 and 5, multiple RF interface modules 52, 54, 56, 58 may service one wireless network 70. As shown in FIG. 3, a single RF interface module 52, 54, 56, 58 may service multiple wireless networks 70. One or more wireless networks 70, 72, 74 may be operated by different network carriers, as shown in FIG. 4 (or in some embodiments in FIG. 5). One or more wireless networks 70, 72, 74 may be operated by the same network carriers, such as may be shown in FIG. 5.

Embodiments described herein may use multiple RF interface modules, wherein the RF interface modules 52, 54, 56, 58 may be assigned to more than one network 70, 72, 74. The networks 70, 72, 74 may be associated with its own network provider or carrier.

Some of the functions of the Buffer Management and Transport Controller 28 include receiving the encoded Data Streams (DS) 14 and buffering them into Multiple Transport Buffers 16 based on complex logic and ensuring that all Transport Buffers (TB) 34, 36, 39 and 40 make it through the RF Interface Modules 52, 54, 56, 58, over Wireless Networks 70, 72, 74 to the Data Transmission Control and Re-assembly module or component 46. Buffer Management and Transport Controller 28 may match the rate of data going into the buffer with the rate of data being taken from the buffer based on received feedback, such as Received BPS. Buffer Management and Transport Controller 28 may control the input rate and the output rate using the received feedback regarding network conditions. Data packets may be buffered in transport buffers (e.g. as a long stream of data packets, or a set of data packets) and selectively and dynamically withdrawn from transport buffers and delivered to a selected RF interface module (associated with one or more networks, and one or more network carriers). The data packets may be continuously and simultaneously transmitted across the RF interface module and network for reassembly at the destination (e.g. receiver).

Multiple wireless networks may be used for simultaneous wireless transmissions. This may increase the data throughput of the system. Each wireless network is associated with an individual maximum throughput. Use of multiple wireless networks simultaneously enables system 10 to aggregate the individual maximum throughputs to provide an aggregated maximum throughput. For example, a data stream 14 may be segmented into multiple data packets (and buffered in transport buffers 34, 36, 38, 40) for provision to RF interface modules 52, 54, 56, 58. Data packets from a single data stream 14 may be transmitted simultaneously over different Wireless Networks 70, 72, 74 to provide an aggregated throughput for transmission of the data stream 14. The selection of which RF interface module 52, 54, 56, 58 to use for the transmission of a given data packet is made on a per data packet basis with reference to feedback received from various components of system 10, including RF interface modules 52, 54, 56, 58, transmission control and data re-assembly 46, and so on.

A variety of methods and techniques may be used for exchanging RF signals through Wireless Networks 70, 72, 74. On the server side of the Wireless Network 70, 72, 74 land-based methods 44 for connecting to Wireless Networks 70, 72, 74 may be used. These connection methods typically may be TCP/IP based, but it is also well known to use IP alone and to use connectionless methods such as UDP over IP to create faster datagram-based delivery methods. Connection methods 44 may also include X.25 packet switched networks and asynchronous dial-up lines. Most advanced data delivery systems use UDP/IP methods over wireless and create their own transport hand-shaking methods to better customize the delivery of information in the harsh wireless environment. Using unmodified TCP over wireless networks usually perform poorly over wireless, since random wireless loss is interpreted as congestion. Several optimized TCP protocols have been created to make TCP more forgiving and better adapted to wireless, but the reliable and in-order nature of TCP is still not well suited for real-time applications. As noted, data packets in accordance with embodiments described herein may segment UDP/IP packets.

Referring back to FIG. 12, the Buffer Management and Transport Controller 28, at 912, is operable to divide the video or audio frames into one or more data packets and place them in the transport buffer(s) 16 until an RF interface module 32 is ready and available to send them. An audio frame may fit within a single data packet. Video frames, depending on the state of the encoder and compression rate vary significantly in size requiring few as one data packet, to many. A data packet may be different from an IP packet, in that an IP packet may be generally larger in size than a radio packet. The Buffer Management and Transport Controller 28 may fragment IP packets into smaller data packets.

The Buffer Management and Transport Controller 28 is operable to segment the frames into data packets to enable routing decisions to be made on a per data packet basis (as opposed to a per frame or data stream basis, for example). Making routing decisions on a per data packet basis may distribute the transmission of a frame or a data stream across multiple different networks simultaneously (or near simultaneously) to leverage aggregate throughput of the multiple different networks. That is, embodiments described herein may aggregate data throughput across multiple networks.

One or more transport buffers 16 may be used to deliver frames on a one to one basis (one transport buffer 16 for each RF interface module 32) or a one to many basis (one transport buffer 16 services one or more RF interface modules 32). For simplicity, the exemplary implementation shown in FIG. 4 uses a single transport buffer 16 as an interface to all of the connected RF interface modules 32. Buffer Management and Transport Controller 28 may match the rate of data going into the transport buffers 16 with the rate of data being taken from the transport buffers 16 based on received feedback. Buffer Management and Transport Controller 28 may control the input rate and the output rate using the received feedback regarding network conditions. Buffer Management and Transport Controller 28 may analyze receiver and transmitter related network conditions across multiple networks. Buffer Management and Transport Controller 28 may establish an input rate and an output rate responsive to the input rate, and the transmitter side network conditions and the receiver side network conditions (e.g. feedback).

At 914, when an RF interface module 32 is ready for data, the next data packet is selected from the designated transport buffer from one or more transport buffers 16 delivered to the RF interface module 32 for transmission over the wireless network 70, 72, 74. That is, the Buffer Management and Transport Controller 28 may make routing decisions (e.g. selection of an RF interface module 32 to use for transmission) on a per data packet basis. The Buffer Management and Transport Controller 28 may make routing decisions based on received feedback.

In accordance with some embodiments, the Buffer Management and Transport Controller 28 may route one or more data packets associated with a data stream to a first RF interface module 32 (and onto a first network 70, 72, 74). The Buffer Management and Transport Controller 28 may route another data packet associated with the same data stream to a second (different) RF interface module 32 (and onto a different network 70, 72, 74). The networks 70, 72, 74 used for transmission of the data packets may be operated by different network carriers (FIG. 4). The networks may be the same or different types of networks. The Buffer Management and Transport Controller 28 may select what RF interface module 32 and network 70, 72, 74 to use for transmission of a given data packet before the data packet is sent. The selection may be based on feedback received from transmission related components (e.g. radio frequency modules) and receiver related components.

As with all wireless transmissions, general failures occur frequently for a variety of reasons. In an exemplary environment the divided Transport Buffers (TP) 34, 36, 38 and 40 allow the Buffer Manager and Transport Controller 28 the ability to make use of many connected RF Interface Modules 32. Each of these RF Interface Modules 32 independently monitors and reports (complex) wireless network 70, 72, 74 connectivity conditions, or feedback. The connectivity conditions (e.g. feedback) may be used by the Buffer Manager and Transport Controller 28 to control routing of data packets between different RF Interface Modules 32.

In another exemplary environment, a single Transport Buffer 34, 36, 38 and 40 acts as the interface between the Buffer Management and Transport Controller 28 and the many connected RF interface Modules 32. RF interface modules 32 may also maintain an internal Transport Buffer 34, 36, 38 and 40 for ease of tracking transmitted and pending data packets.

At 916, the data packet is received over the wireless network 42 at transmission control and data re-assembly 46 for re-assembly into frames of data streams.

FIG. 5 is a block diagram of an exemplary system 50 with multiple wireless networks 70, 72 and 74. In this embodiment the Data Processor and Encoder 24 act to encode and divide data transmission from a Data Source 20. The Buffer Management and Transport Controller 28 has further extensions to support a wide range of RF Interface Modules 52, 54, 56 and 58. In this environment the RF Interface Modules 52, 54, 56 and 58 are located across a plurality of Wireless Networks 70, 72 and 74 which may be operated by one or more wireless carriers. These Wireless Networks 70, 72 and 74 could include one or more similar wireless network types, such as two GSM EDGE networks, or they could all be unique. In this example illustration, wireless networks 70, 72, 74 use a plurality of base stations 60, 62, 66, 68 to resolve coverage and capacity issues. The wireless networks may be associated with different data transmission rates, and other connectivity conditions.

The system 50 may be used for delivering large volumes of source data information simultaneously over one or more wireless networks 70, 72 and 74. As noted above, the data processor and encoder 24 may convert a continuous audio-video data stream into frames. The data processor and encoder 24 may then encode the frames into data packets. System 50 is operable to segment data streams and frames into smaller data packets and to distribute transmission of the smaller data packets across the multiple wireless networks 70, 72 and 74.

The RF modules 52, 56, 58 enable simultaneous transmission of data packets to multiple wireless networks 70, 72 and 74. This may enable realization of an aggregated maximum data throughput by aggregating individual maximum data throughputs associated with each of the different wireless networks 70, 72 and 74.

The Buffer Management and Transport Controller 28 buffers each of the encoded data packets in one or more transport buffers for delivery to the RF modules 52, 56, 58. The Buffer Management and Transport Controller 28 selects an RF module 52, 56, 58 on a per data packet basis based on received wireless connectivity conditions for each of the modules 52, 56, 58 (e.g. feedback). The wireless connectivity conditions or feedback may also be received from data transmission and control re-assembly, as described herein. The per data packet selection enables simultaneous transmission over multiple wireless networks 70, 72, 74 to maximize throughput. A single data stream is converted into individual data packets where transmission may be spread across multiple wireless networks 70, 72, 74 simultaneously based on an optimal routing via RF module 52, 56, 58 and associated wireless connectivity conditions. An example wireless connectivity condition is network latency as defined previously.

The Buffer Management and Transport Controller 28 monitors the received wireless connectivity conditions (e.g. feedback) to direct each encoded data packet on a per-packet basis to one of the modules 52, 56, 58. In an example, one data packet may be routed to a first module 52, 56, 58 while another data packet may be routed to a different module 52, 56, 58. Similarly, one data packet may be routed to one wireless network 70, 72, 74 while another data packet may be routed to another wireless network 70, 72, 74. This enables simultaneous transmission of a single continuous data stream over the plurality of wireless networks 70, 72, 74. As noted, the routing is on a per-data packet basis, a per-RF interface module basis and a per-network basis to use multiple networks 70, 72, 74 simultaneously for a single data stream. An RF module 52, 56, 58 maintain multiple network connections to the wireless networks 70, 72, 74 simultaneously.

The Buffer Management and Transport Controller 28 is operable, using the received wireless connectivity conditions, to dynamically and selectively redirect the data packets from one RF module 52, 56, 58 to another module 52, 56, 58, if for example, one RF module 52, 56, 58 is near capacity, experiencing congestion, experiencing errors or delay, and so on. The Buffer Management and Transport Controller 28 is operable, using the received wireless connectivity conditions, to dynamically and selectively redirect the data packets for a data stream from one available wireless network 70, 72, 74 to another available different wireless network 70, 72, 74, whereby data throughput to the destination receiver (e.g. data transmission control and re-assembly module) is maintained.

The system 50 includes a data source 20 operable to capture a continuous real-time stream of audio-video data. The simultaneous (or near-simultaneous) transmission may occur in delayed real-time as defined previously.

In an environment where there are multiple connected RF interface modules 32, 52, 54, 56, 58 (either to separate and distinct networks 70, 72, 74, or using the same or different carrier), the alternatives for delivering Data Packets are enhanced. If one of the connected RF interfaces modules 32, 52, 54, 56, 58 reports congestion or transmission issues, there are many alternatives to transmit around the slow RF interface 32, 52, 54, 56, 58. For example, RF interface 32, 52, 54, 56, 58 might become busy and start reporting increasing amounts of network latency. As a result, any data packets assigned for delivery to that RF interface 32, 52, 54, 56, 58 might slow down dramatically while waiting for wireless spectrum to become available.

Figure 10:
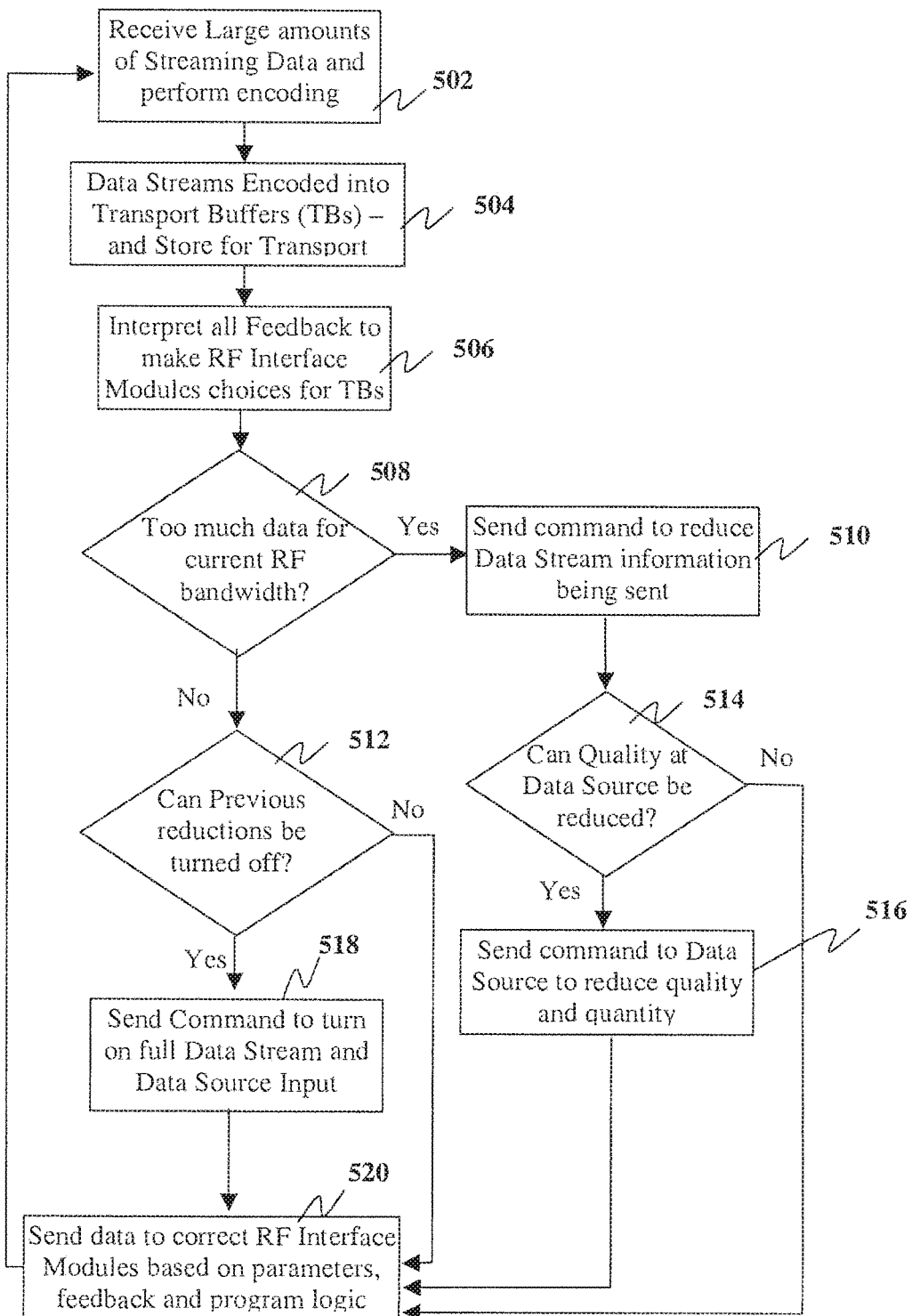
FIG. 10 is a flow chart illustrating the flow of data from the mobile source to the destination.
Figure 11:
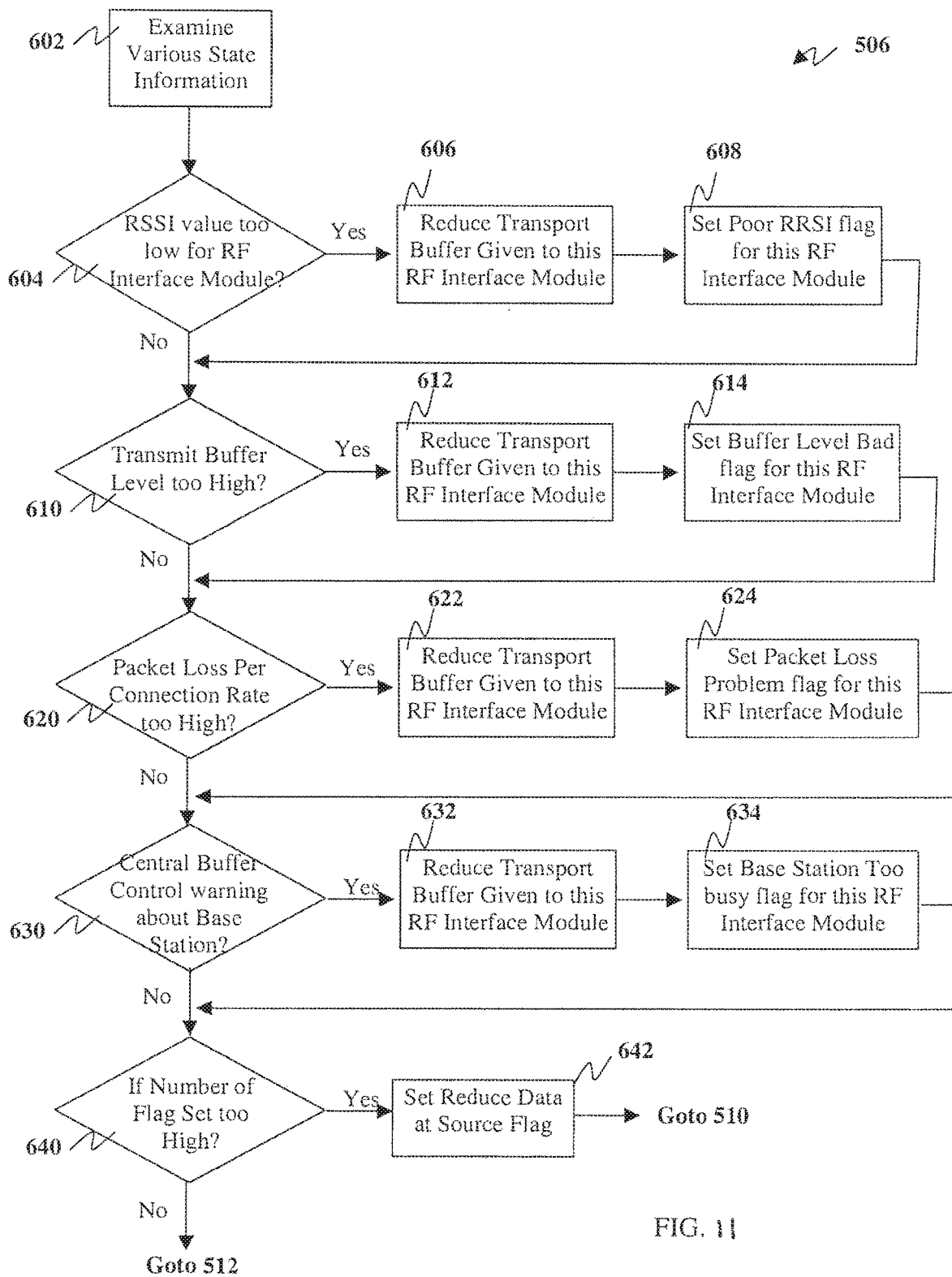
FIG. 11 is a flow chart illustrating the flow of data to determine which paths to use for delivery to a destination.

The Buffer Management and Transport Controller 28 is operable to monitor received connectivity conditions (e.g. feedback) to detect congestion and transmission issues. Data Packets originally planned for one RF Interface Module 54 might be re-routed by the Buffer Management and Transport Controller 28 to another RF Interface Module 56 and sent through base station 66 onto another Wireless Network 72 instead. Examples are shown in the flowcharts of FIGS. 10 and 11. Through the monitoring of feedback or connectivity conditions, the management of RF Interface Modules 52, 54, 56 and 58 helps to provide the Buffer Management and Transport Controller 28 its unique ability to keep high throughput when delivering data packets over multiple wireless networks 70, 72, 74.

In cases where a network 70, 72, 74 is connected to more than one RF interface modules 52, 54, 56, the increase in available aggregated throughput may not as great as it would be if the networks 70, 72, 74 were separate (e.g. only connected to one RF interface module). However, there is still an advantage due to the increase in redundancy and increase of options for RF interface modules. It may be in most cases a process of diminishing returns.

In some examples, a single transmitter may have devices or RF interface modules for each of the (usually several) different networks 70, 72, 74 visible or available. In some circumstances, when there is not enough network variety, a transmitter may be configured with duplicate interface modules to the same network. Duplicating wireless networks 70, 72, 74 may not necessarily lead to doubling throughput due to network limitations, but it still may increase available data throughput.

A role of the Buffer Management and Transport Controller 28 is the ability to manage decisions around utilizing all attached RF Interface Modules 52, 54, 56 and 58 for transmission of data packets based received feedback or connectivity conditions. The decisions may relate to which RF Interface Modules 52, 54, 56 and 58 to use to transmit or deliver a particular data packet. Decisions may be made on a per packet basis in order to spread the transmission of data packets from a single data stream over multiple RF interface modules 52, 54, 56 and 58 and networks 70, 72, 74.

Delivery to the Data Transmission Control and Re-assemble module 46 may proceed more smoothly with a greater number of RF Interface Modules 52, 54, 56 and 58. In this embodiment the Data Transmission Control and Re-assembly module 46 is particularly configured to connect to each supported Wireless Network 70, 72 and 74 and reassemble data packets from all (e.g. three) networks. These links 44 will deliver data packets from each of the RF Interface Modules 52, 54, 56 and 58 which will be re-assembled in order based on the time stamps and sequence numbers placed into each data packet by the Buffer Management and Transport Controller 28. Accordingly, a data packet may contain timing and sequence data for use by Data Transmission Control and Re-assemble module 46 to re-assemble the data stream.

The encoded Data Streams 22 consist of a series compressed (and possibly encrypted) video and audio frames. The Buffer Management and Transport Controller 28 may monitor the reported network feedback (e.g. connectivity conditions), calculate the health of the individual RF interface modules 52, 54, 56, 58 or networks 70, 72, 74, and the aggregate session of all the RF interfaces or networks combined, and then act on the results by making routing decisions.

For instance, if the network latency of a connection is slowly increasing then the Buffer Management and Transport Controller 28 may elect to decrease the rate of data packets sent to the associated RF interface for delivery and redirect data packets to another RF interface module.

The system is operable to evaluate the sum of all the combined connection throughput rates and based on that information increase or decrease the compression and encoding rate (and the resulting actual data bit rate).

A simplified illustrative system with two connections in a steady state, with both connections transmitting roughly the same amount of data will be described herein as an illustrative and non-limiting example. This is an example for illustrative purposes and other variations, configurations and modifications may be used for systems.

Network 1 associated with connection 1 may start to experience heavy loading due to increased activity from other mobile devices competing for a shared wireless spectrum.

As the loading on network 1 increases, the measured network latency may increase, or the number of lost packets may increase, or some other network measurement may indicate congestion. This measure may be provided or communicated as feedback or connectivity conditions. When one of these conditions passes a threshold, the Buffer Management and Transport Controller 28 may start limiting the amount of data packets handed to corresponding RF interface 1 for delivery to network 1. Accordingly, the Buffer Management and Transport Controller 28 may be configured with rules for threshold conditions to govern routing of data packets. The threshold conditions may be tailored or configured to specific networks and interface modules or types thereof, or may be standard threshold conditions applicable to all types of networks and interface modules.

The Buffer Management and Transport Controller 28 may also take steps to start decreasing the amount of frame data generated by the data source 20.

The Buffer Management and Transport Controller 28 may also take into account the delay between the instant a data source decrease is requested and when the decrease takes effect. During this interval, the Buffer Management and Transport Controller 28 may redirect data packets to RF interface 2 such that RF interface 2 may temporarily increase the amount of data packets it transmits. The level of padding information on RF interface 2 may be temporarily decreased to accommodate the additional volume of information.

Reducing the traffic sent to connection 1 allows the wireless network 1 to recover and reduce the measured latency. If the latency decreases past the set threshold, the Buffer Management and Transport Controller 28 may be able to once again increase the data packets sent to that connection (e.g. network 1 and RF interface 1). However, if the network latency continues to increase, the Buffer Management and Transport Controller 28 may continue to decrease the traffic sent to connection 1. If the latency passes the point at which data can no longer be sent with a reasonable expectation of delivery and reassembly in time for play out, then the connection 1 may be removed from the active transmission pool entirely and used only for retransmission and testing. The connection 1 may not be used again until the measured network latency once again decreases to a usable rate. This rate may be configured as a rule for Buffer Management and Transport Controller 28.

RF interface modules may be limited to a percentage (e.g. 80%) of their calculated/measured individual maximum bandwidth or throughput. The remaining space may be reserved for padding, which may refer to extra space to allow the transmission of backlog and/or lost data packet resend requests. Padding may also be employed to keep the connection data rates relatively constant. This may prevent cellular or other wireless networks from reducing the bandwidth assigned to the RF interface when the data rate is reduced. Increasing the data rate again later may not be possible if the network resources have been allocated to other users, or may come only after a noticeable delay. Accordingly, the threshold values for RF interface modules may factor in padding to reserve extra space or capacity. The threshold value may refer to a capacity condition or network capacity condition that is measured by either the transmitter or receiver. If measured by the receiver, the feedback is sent to the transmitter and used in making routing decisions for subsequent data packets. Embodiments described herein include measured conditions such as one-way network latency, jitter of such latency, packet loss, received packet order, and sent and received bit rates.

Referring back to FIG. 3, in one embodiment, the receiver collects raw network and packet delivery information as it is generated by the received data stream(s). The collected information is then statistically filtered over a series of intervals, the length of which is determined by a slow moving average of the network latency L1 352. The Network can be modelled as a FIFO of "L1 352" ms, so the statistics are calculated over one complete "filling" of the FIFO.

At the end of every window, the following statistics or values can be reported back to the transmitter:
The size of the window (in milliseconds);
Mean latency of all packets received in the window;
Latency standard deviation for all packets received in the window;
Missing packets—packets that were missing from the previous window, not the current window. In some embodiments it can be difficult to tell the difference between a late packet and a missing packet, i.e. a missing packet might just be really late, so a decision may be made after the subsequent window;
Received packets;
Received bytes;
Latency jitter—A filtered average of inter-packet time differences in network latency L1 352. This is not the traditional calculation of jitter used for VoIP and other real-time protocols. For those protocols they maintain an expected arrival time for packets (e.g. every 20 ms), and jitter is calculated as a filtered average of the differences between actual and expected packet arrival times;
Received bandwidth;
Internal queue status.

The data rate of the stream may fluctuate as a function of the encoding/compression mechanism. Uncompressed frame data may be relatively constant, but may be too large to transmit reliably over the RF interface modules. Compressing may alleviate the size problem, but at the cost of extreme size variability between the individual frames. Using an infinite GOP may decrease the variation in some cases. However, since a scene change may still require a new full frame, the variation may not be entirely eliminated. Padding may be used to smooth the data rate and help ensure a consistent level of network service.

Padding may also be used to resend missing data packets, backlog data (from when a connection starts to decrease its data rate before the source decreases), and when there is nothing else for example, the RF interface modules may transmit duplicate packets.

An RF interface module may include transmitter hardware or may be coupled thereto. The transmission control and data reassembly 46 may include receiver hardware or may be coupled thereto. In order to calculate the one way (transmitter to receiver) latency, accurate timing synchronization may be required. Other solutions may track and react to the round trip latency. However, this may ignore a very basic property of the connected networks: network latency may be asymmetrical, with the network latency from the transmitter to the receiver being more likely to increase as the load increases. There typically is far more data being sent from the transmitter than there is to the transmitter. Further complications may arise from wireless network configurations. Wireless networks may be constructed or configured to have a much greater proportion of the available bandwidth dedicated to download (sending to the transmitter) versus upload. Hence, the network latency may be much more likely to increase on the upload/transmit side. Any solution which depends on the round trip latency may understate the current network latency and run in to transmission difficulties as a result.

Figure 6A:
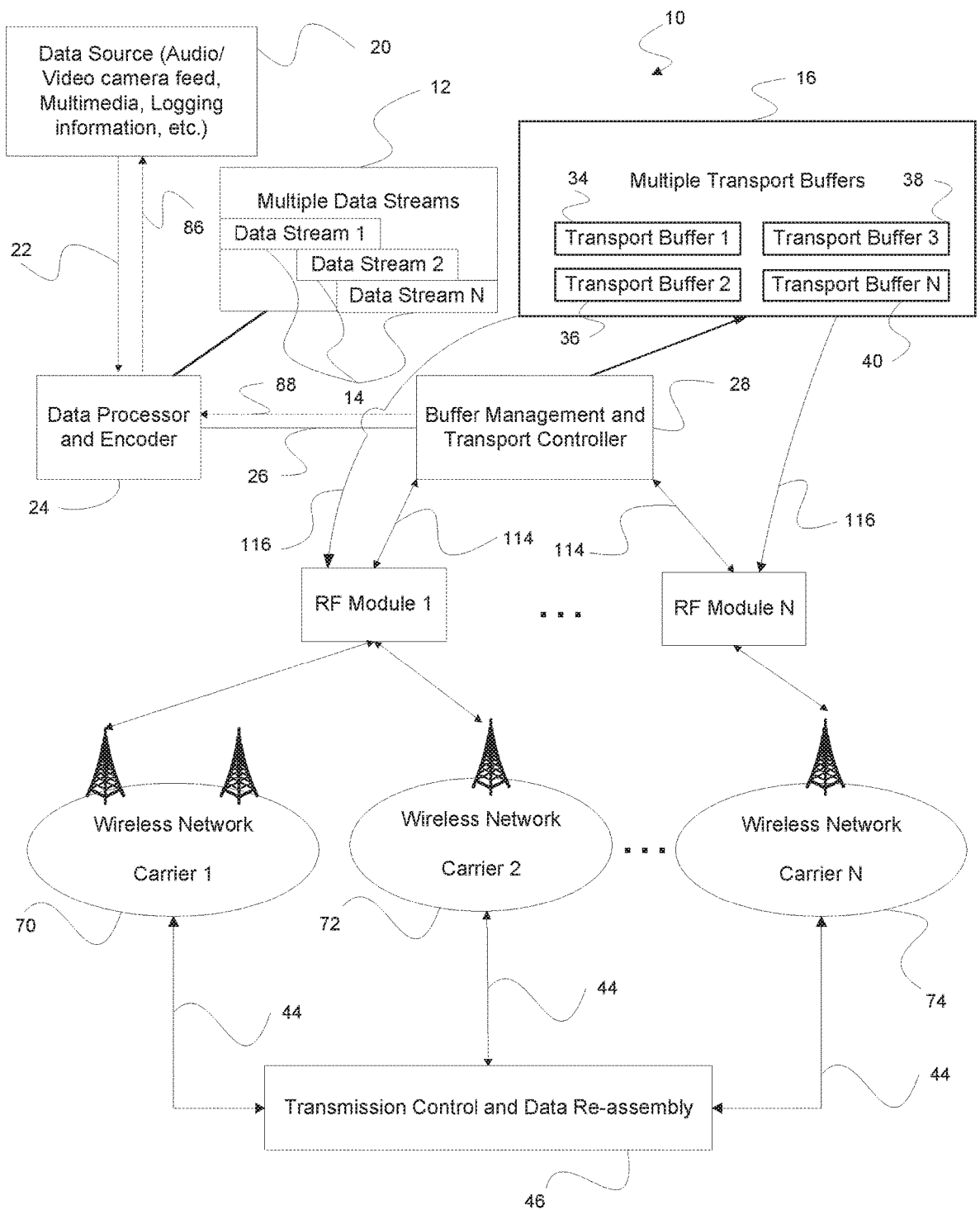
FIGS. 6a and 6b are block diagrams of an exemplary system showing delivery of data packets using feedback mechanisms according to some embodiments.
Figure 6B:
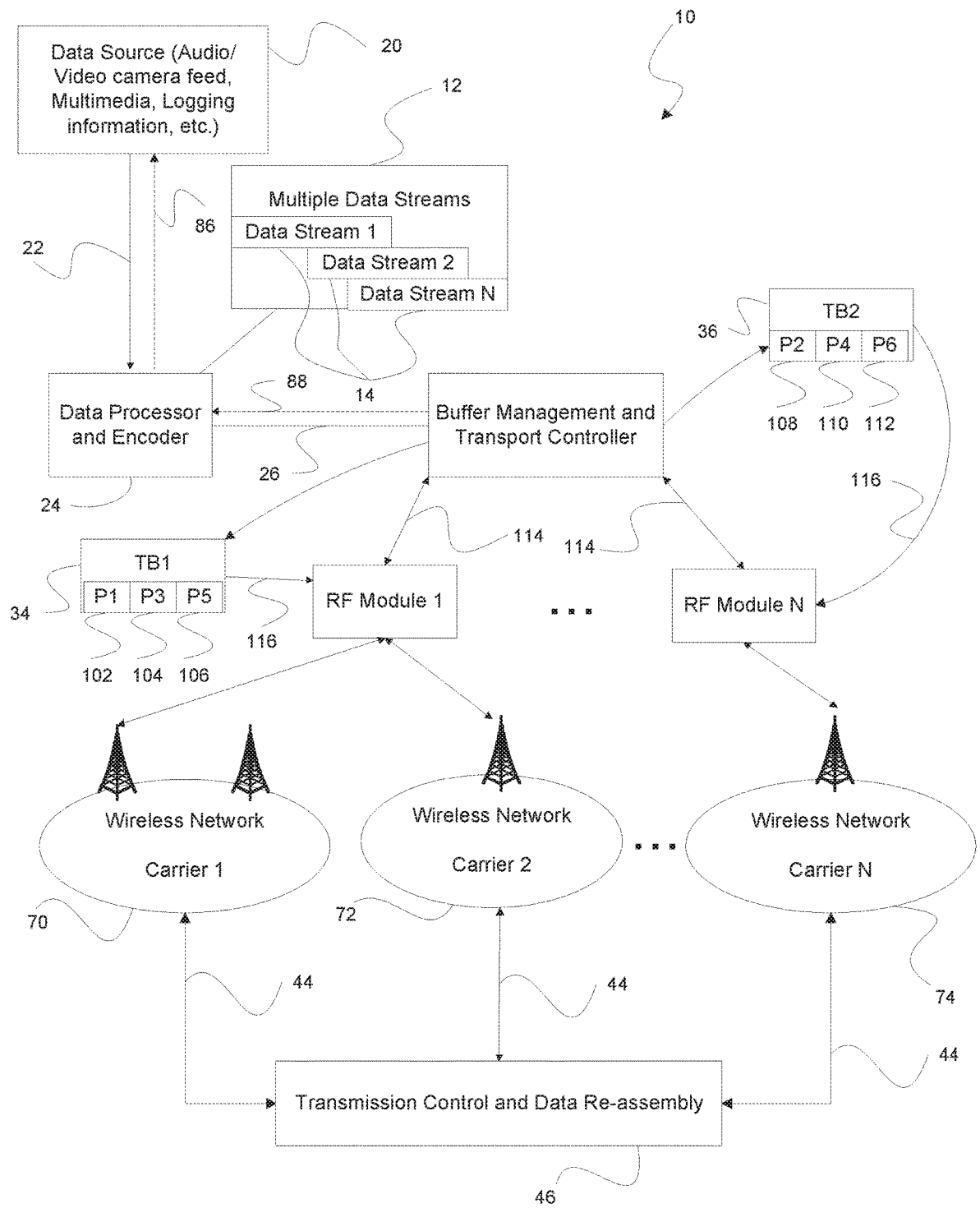

FIGS. 6a and 6b are schematic block diagrams of an exemplary system 80 showing delivery of data packets using feedback mechanisms or connectivity conditions. The embodiments discussed may extend to an environment where additional wireless networks are supported. FIGS. 6a and 6b also provide greater detail on the exchange of both control information 114, 88 and 86 and Multiple Transport Buffers 16 between the components of the system. Control information may refer to connectivity conditions or feedback. Feedback may also be sent from data transmission control and reassembly via link 44.

FIG. 6b is a schematic block diagram corresponding to FIG. 6a showing Transport Buffer 1 or TB1 (34) and Transport Buffer 2 or TB 2 (36) in greater detail. As can be seen, TB 1 (34) contains odd numbered packets 102, 104 and 106 and TB 2 (36) contains even numbered packets 108, 110 and 112. Even though other Transport Buffers are not explicitly shown in FIG. 6b for ease of illustration, it is understood that embodiments shown in FIG. 6b may comprise more than two Transport Buffers within or connected/coupled to the Buffer Management and Transport Controller 28. In both FIGS. 6a and 6b, data Packets may be delivered via links 116 to RF Interface Modules (or simply "RF Modules"), while feedback information 114 (e.g. connectivity condition) may be provided to the Buffer Management and Transport Controller 28.

Within or connected/coupled to the Buffer Management and Transport Controller 28, each Transport Buffer TB-1 (34), TB-2 (36), TB-3 (38) . . . and TB-N (40) may act as a container for data packets (P), shown in TB-1 as P1 (102), P3 (104) and P5 (106) in some embodiments. If the data being exchanged is audio and video data then these data packets may be individual frame segments, portions thereof, or a collection of frame segments. If the data being exchanged is multimedia data then it could also be individual pictures, gestures or some other digital data, or portions thereof. Segmented data packets may be buffered in transport buffers (e.g. as a long stream of data packets, or a set of data packets) and may be re-assembled at the receiver. Data packets can be selectively and dynamically withdrawn from transport buffers and delivered to a selected RF interface module (associated with one or more networks and one or more network carriers). The data packets are continuously and simultaneously transmitted across the RF interface module and network for reassembly at the destination (e.g. receiver).

In the exemplary implementation, audio and video frame data placed within the transport buffer for sending is compressed, encoded, possibly encrypted, and split into data packets for individual transport. The data packets may be sized such that when transmitted over the intervening networks (e.g. IP networks in some examples), they may experience no transparent fragmentation. The maximum size of a UDP packet may be the determining factor in the number of data packets required to represent an audio or video frame, for example.

The data packets make up a part of the original Data Streams (DS) 14 coming from the Data Processor and Encoder 24 and Data Source 20. In the illustration shown in FIG. 6b, the odd numbered packets 102, 104 and 106 are contained by Transport Buffer 1 (TB-1) 34 and even numbered packets 108, 110 and 112 are contained by Transport Buffer 2 (TB-2) 36. These may be sent respectively to RF Interface Module 1 (RF-1) 52 and RF Interface Module 2 (RF-N) 58. Other RF Interface Modules could be present, but for simplicity only two RF interface modules 52 and 58 are illustrated. Accordingly, data packets from the same original data stream 14 may be simultaneously transmitted using multiple interface modules 52, 58, and wireless networks 70, 72, 74. This may increase throughput as transmission is not limited to a single interface module. Further, a single RF interface module 52 may connect to multiple wireless networks 70, 72, 74.

As Data Packets are delivered via links 116 to RF Interface Modules 52 and 54 respectively, feedback information 114 (e.g. connectivity condition) is provided to the Buffer Management and Transport Controller 28 from RF-1 (52) and RF-2 (54). This information includes, for example, Network Latency, lost packet reports, RF Interface Module buffer fullness, RF metrics (e.g. RSSI, RSCP, EC/IO, CQI) and their rates of change, time between successful transmission attempts, current available bandwidth, historical information tabulated from previous readings, and so on. This feedback information assists the Buffer Management and Transport Controller 28 to determine the best means or route for delivering additional data packets to follow. The selection of an RF interface module is made before the additional data packets are transmitted. The selection of each subsequent Data Packet to be given to all available RF Interface Modules 52 and 54 is made based on as much feedback information 114 as can be gathered by the RF Interface Modules 52 and 54 regarding various components of the system. In this system the ability to feedback relevant status information (e.g. connectivity condition) about current connected network conditions to the Buffer Management and Transport Controller 28 may improve the overall performance of the system, may optimize use of RF interface modules, and may increase throughput.

Additional options may also be possible in an exemplary system to deal with feedback 114 from RF Interface Modules 52 and 54. For example if the calculated aggregate throughput (e.g. aggregate of individual throughput) based on the feedback 114 is less than the current source data rate (coming from the Data Processor and Encoder) and/or there is a systemic inability to deliver data packets to the receiver then the Buffer Management and Transport Controller could send a throttle command 88 to the Data Processor and Encoder 24. In this exemplary embodiment the Data Processor and Encoder 24 may have additional functionality added to deal with any feedback 88 given. This feedback might have several effects, such as limiting the number of Data Streams 14 sent to the Buffer Management and Transport Controller 28, or reducing the output resolution, quality and/or frame rate. This may also involve increasing or decreasing the compression rate and characteristics. With future advanced Data Source equipment, such as high-end production cameras, the Data Processor and Encoder 24 might have the option of sending a control signal 86 to a more advanced Data Source 20 to reduce the quality and quantity of information being sent. In the example of a production camera this advanced Data Source 20 might be able to change the picture resolution dynamically, or perhaps inform the user of the Data Source 20 equipment that a change in setting is required. This measured feedback mechanism through the Buffer Management and Transport Controller 28 may be programmatically determined based on parameters such as buffer sizes, high water and low water thresholds and other algorithms.

Figure 7:
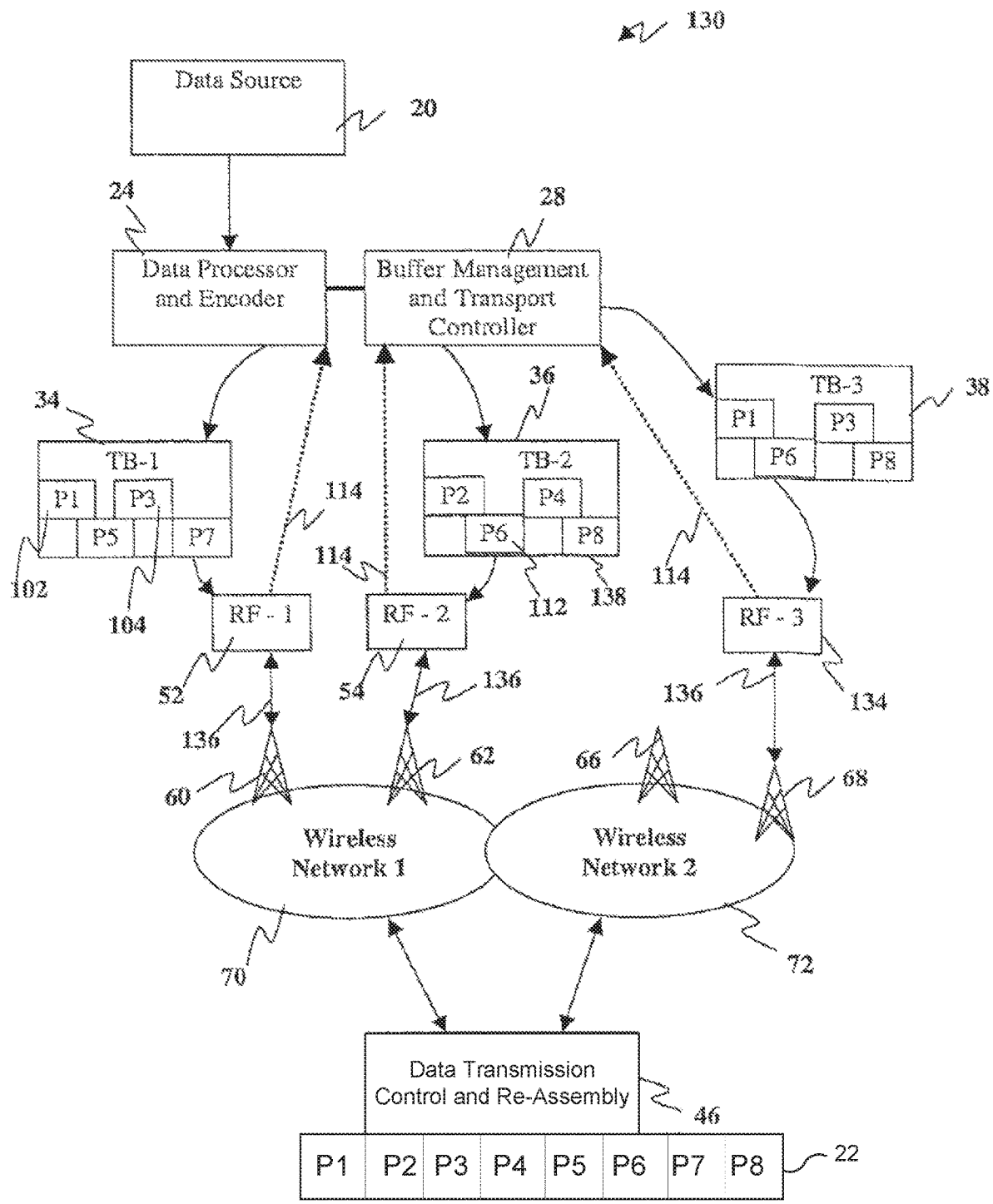
FIG. 7 is another block diagram of an exemplary system showing delivery of data packets over multiple wireless networks using feedback mechanisms.

FIG. 7 is a block diagram of another exemplary system 130 showing delivery of data packets over multiple wireless networks 70 and 72 using feedback mechanisms. In this example RF Interface Modules 52, 54 may connect or couple to the same wireless network 70, and RF Interface Module 134 may connect to an additional wireless network 72. The selection of two wireless networks and three RF Interface Modules is may be exemplary and non-limiting. Other examples may include a greater number than shown in this illustration.

In FIG. 4 the Buffer Management and Transport Controller 28 has utilities to use the additional RF Interface Module 134 to further improve the reliability of delivering data packets. As feedback 114, is received from all RF Interface Modules 52, 54 and 134 the Buffer Management and Transport Controller 28 determines which wireless links 136 and wireless networks 70 and 72 are performing well or poorly. Given the wide range of encoding methods available to the Buffer Management and Transport Controller 28 it is possible to prioritize some Data Packets (102, 104, 112 and 138) as more important than others. These more important Data packets (102, 104, 112 and 138) could be considered essential to reassembling the data. In the example of audio and video data being encoded, these data packets may be considered essential to maintaining usable picture quality, while other data packets may be considered incremental to improving picture quality (e.g. high definition or high framerate) components and are therefore less essential.

In marginal circumstances (where the bandwidth is available for both video and audio, but it is either error prone or close to the cut-off for viable video), the Buffer Management and Transport Controller 28 may choose to only transmit the audio stream, or to transmit a reduced frame rate video stream. In such a scenario, the receiver displays a delayed or frozen picture while audio continues normally.

When the transmitter goes into audio-only mode, video can be still encoded but not transmitted. Audio is prioritized and duplicated (whenever possible) across all available connections.

Another embodiment enhances audio-only mode with a low-framerate, non-real time video stream. Audio is encoded and transmitted in real-time, but video is encoded at a significantly reduced frame rate—1 frame every 3 seconds, or similar. The resulting video frames are marked as not real time and sent to the receiver. This allows the receiver to augment the audio stream with a periodically updating "slideshow" when the circumstances of the connected networks do not allow for a complete video stream.

At all other times, the Buffer Management and Transport Controller 28 may use the space reserved for padding to duplicate important frames (typically video key frames and audio frames) to minimize the possibility of display error and improve output recovery times when display errors do occur.

In this example the Buffer Management and Transport Controller 28 may replicate these Data Packets (102, 104, 112 and 138) within Transport Buffer 3 (TB-3) 38 and may send them to RF-3 (RF interface modules 134) for wireless transmission. In the exemplary implementation, higher priority packets may also be transmitted as duplicates in the padding component. Alternate implementations may also transmit higher priority packets on RF interfaces judged to be the most reliable and/or fastest, with the lowest network latency. In the event that the Data Transmission Control and Re-assembly module 46 receives duplicate frames a mechanism may detect and delete the duplicates. By adding additional logic and intelligence within the Data Transmission Control and Re-assembly module 46, additional links to wireless networks and duplicate detection can be added. If the essential Data Packets within Transport Buffer 1 (34) and Transport Buffer 2 (36) are lost in transmission then the redundant transmission of those Data Packets within Transport Buffer 3 (38) may ensure their arrival. As noted, Data Transmission Control and Re-assembly module 46 may provide feedback to Buffer Management and Transport Controller 28 for use in routing decisions.

In the exemplary implementation, the receiver (e.g. Data Transmission Control and Re-assembly module 46) may notify the sender that a particular data packet never arrived. The Buffer Management and Transport Controller may then select on one of the other, alternate RF interface modules 52, 54, 134 to resend it. Transmission of lost data packets may be prioritized over regular stream data. Transmission of lost data packets may also replace some or all of the bandwidth reserved for padding. Ideally, the fastest available connection resends the missing data packet to maximize the time available for frame reassembly.

FIG. 7 illustrates a reassembled data stream 22, wherein data transmission control and re-assembly 46 reassembles data packets (P1 to P8) 22 using timing and sequence information.

FIGS. 6a, 6b and 7 provide example illustrations of how a single continuous data stream 22 may be segmented into multiple data packets (P1-P8), transmitted simultaneously or concurrently over different wireless networks using different RF interface modules, and re-assembly at the receiver side. As noted herein, this may aggregate data throughput from different wireless networks. Further, routing on a per-packet basis based on continuous feedback may optimize usage of wireless networks and RF interface modules. One data packet may go to one network and another data packet may go to another (or different) network. This is different than sending the same data packets over different network paths (of the same network), or sending the same data packets over different networks, where selection may be made after the data packet has been transmitted. Instead, embodiments described herein may select an estimated optimal (or near optimal) RF interface module and network prior to transmission of the data packet.

Figure 8:
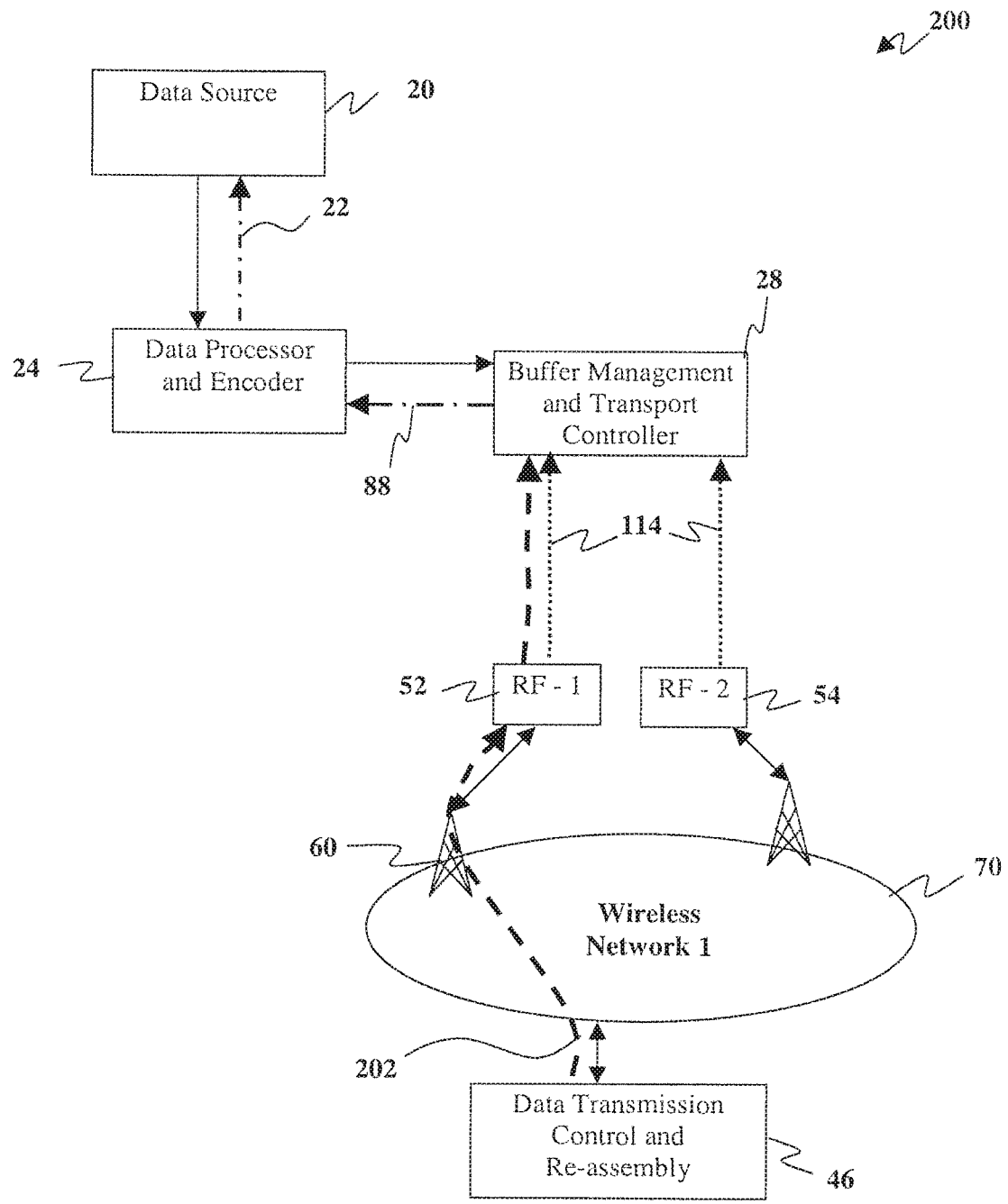
FIG. 8 is a block diagram of an exemplary system showing additional feedback mechanisms.

FIG. 8 is a block diagram of an exemplary system showing additional feedback mechanisms (e.g. connectivity conditions). This simplified example illustrates one wireless network 70 for simplicity, but multiple wireless networks 70, 72, 74 may form part of system 200. The feedback 114 from RF Interface Modules 52 and 54 may still be available, but augmented with feedback information 202 coming from the Data Transmission Control and Re-assembly 46 component (e.g. receiver). This additional feedback 202 may be used to carry information about successful delivery of Data Packets, information about how long it took each data packet to arrive (i.e. network latency) and many other characteristics about the reception of data packets. The Buffer Management and Transport Controller 28 processes the received feedback from the RF Interfaces and the receiver. Based on the calculated health of the transmission, the Buffer Management and Transport Controller 28 instructs the Data Processor and Encoder 24 to increase or decrease the current data rate. The Data Processor and Encoder 24 may instruct the Data Source 20 to limit the quantity and quality of information being sent.

In a wireless environment feedback from a range of sources may improve complex logic made by controller when sending large amounts of time critical digital information. The Buffer Management and Transport Controller 28 may improve its success rate of data packets delivered with each new piece of information provided to it, and may also improve transmission rate by making decisions based on continuous updated feedback.

Feedback may relate to information received from the application layer (layer 7 from OSI model, for example). The application layer may be the closest layer to the end user, such that both the application layer and the user may interact directly with the software application. The application layer may interact with software applications of embodiments described herein that implement a communicating component and control underlying hardware components. An application layer implementation may not require knowledge of underlying network operations.

A data packet in accordance with embodiments described herein may be different from an UDP/IP packet. Ideally a data packet is sized appropriately to fit with a UDP/IP packet without further fragmentation, although, in some circumstances, on some connections, this may not be possible. An advanced embodiment may detect the maximum UDP/IP packet size and size data packets appropriately.

The application layer formats a data packet into one or more UDP/IP packet(s) and delivers the result to the RF Interface for delivery to the Internet.

In implementations where the RF Interface is replaced by an Ethernet connection, no further fragmentation is required.

For RF interfaces connected to a cellular network, the UDP/IP packet may be further fragmented by the radio layer for delivery across the wireless network to the base station. This network layer is responsible for fragmenting the UDP/IP packet (into pieces) according to the connected network proprietary protocols and requirements. Radio transmission of data to (and from) the base station may use technologies that are not contemplated in this document.

The network layer within the connected network reassembles the UDP/IP packet before forwarding it to the Internet for delivery to the receiver.

Some implementations may involve an iterative process of improvement in listening to and adapting to feedback from the RF interfaces, the wireless networks, and the receiver (e.g. data transmission control and re-assembly) in the studio. Various feedback loops are shown in the drawings, including feedback 202 from data transmission control and re-assembly 46, feedback 114 from RF interface modules 52, 54, 56, 58, feedback 88, 406, 404 from buffer management and transport controller 28, and feedback 86 from data processor and encoder 24.

An example implementation may consider RF interface buffer fullness, measured one-way network latency, and lost packets (the difference in volume between transmitted and received packets) as a mechanism to identify whether a specific connection (carrier network and/or RF interface module) is working well. If the RF interface buffer fills up, it indicates that there is resource contention or interference at the RF layer, so the transmit data rate may be adjusted downwards to compensate. Similarly, if the one-way network latency increases, it means increased buffering by some network element between the transmitter and receiver, which will eventually result in packet loss if that buffer becomes full—in either of these scenarios, reducing the transmit data rate is prudent to maintain real-time system performance. When the RF interface buffer empties, the one-way network latency drops, or packet loss is reduced, the transmit data rate may increase. This example implementation may lead to a situation where the transmitter may ramp up the data rate on a connection until data packets either start to become effectively lost by the network, or the one way network latency increases to a point where it is no longer usable for the selected glass-to-glass latency.

Lost packets are typically an indicator of network congestion, but in a wireless environment loss can also occur randomly due to physical interference. As such, this example embodiment places less weight on packet loss as a metric, preferring RF interface buffer fill and one-way network latency as earlier and more reliable indicators of congestion. Future embodiments that are able to reliably discriminate between loss due to congestion and random loss due to wireless effects can put a heavier weight on loss as a metric for determining transmit data rate.

As a further example, embodiments described herein may involve characterization of the channel, which may be used as part of feedback. Buffer management and transport controller may allocate data to a particular channel based on the characterization.

Another implementation may consider both the transmitted bandwidth and the received bandwidth. Comparing the two values may give an approximation of the amount of data actually traversing the connected network, and how much of a backlog is building up. In the ideal world, these two values may be equal (transmitted=received). In practice, however, this may not be possible as there may typically be a delay between when a packet is transmitted and when it is received, e.g. the network latency. Without some mechanism to account for this delay and align the bandwidth reports, there may be no mechanism to accurately determine the actual health of the network.

As a result, another implementation may involve accurate time synchronization between the transmitter and the receiver. The time synchronization may be referred to as feedback. An embodiment may make use of the time synchronization to determine the current network latency. The network latency, as defined previously, is important to model the behaviours of the connected network. Note that the network latency is not the same as measuring the round trip time (frequently denoted RTT) from the transmitter to the receiver and back to the transmitter again and dividing it in half. There is no guarantee that ½ RTT is the same as the network latency since the time for data to traverse the connected network may not be symmetrical. Due to the design and nature of some connected networks the time required for a data packet to travel from the transmitter to the receiver (upload) may be much longer than the time for the same packet to travel from the receiver to the transmitter (download). If they are not the same, and the algorithm used ½ RTT, inaccurate timing may result.

Before an embodiment starts a data stream, the transmitter and receiver may synchronize their clocks. The transmitter sends a data packet to the receiver with the transmitter's current time. When this packet arrives at the receiver, the receiver's time stamp is added the packet is sent back to the transmitter. The packet is passed back and forth a second time, again collecting time stamps at each stop. Once the packet has two pairs of time stamps (minimally after two round trips), the transmitter is able to calculate an initial time correction offset. The offset is stored, and the packet stamped and sent again on another round trip. This allows either the transmitter or the receiver to calculate the round trip latency. The mechanism is repeated until the round trip latency comes to a minimum (averaged over a period, looking for a best case). This value is then halved to approximate the one-way latency. Based on the information in the time packet, the transmitter is able to determine the difference between the transmitter and receiver clock and calculate an offset for conversion. A final time packet is sent to the receiver to confirm the time offset and allow the receiver to synchronize its clock to the transmitter.

This process must be repeated periodically (e.g. every five minutes) to account for clock drift—tiny variations in CPU frequencies that cause the time offset between the transmitter and the receiver to shift over time. If the time synchronization is not updated, the resulting error may cause the transmitted stream to fail.

Typically, this requires the process to be repeated during an active broadcast (while the transmitter is actively sending a live video stream) over a potentially heavily loaded channel. It is not possible to halt the stream (even over one of the available channels) or reserve a channel to dedicate for time synchronization. The algorithm accounts for the potential asynchronous nature by sending the time packet over every available channel and selecting the best case—the first one delivered. This, combined with the repetition, allows the algorithm to come to a stable minimum and determine an accurate offset.

In some cases, clock drift between the transmitter and receiver may be so severe that the period of time synchronization (5 minutes or otherwise) may not be frequent enough to result in a usable value for the measured distance between the transmitter and receiver clocks. The example embodiment compensates for this scenario by calculating an average velocity for the measured distance. Each time the synchronization algorithm completes, an additional data point for distance is recorded—when there are at least two distance measurements, a least squares trend line for velocity can be calculated, which is then used to approximate the current distance until the next time the synchronization algorithm is run.

Once an embodiment has synchronized the time between the transmitter and the receiver, determining the network latency, on a per data packet basis, is straightforward. Each data packet may be time stamped with the current time at the transmitter before sending. Once the packet arrives at the receiver, the time stamp is adjusted using the calculated offset, compared against the current time, and the network latency determined by a simple mathematical calculation.

Time synchronization may allow the transmitter to align bandwidth reports with the receiver and know exactly (within the resolution of the system clocks) when a data packet has been received. An implementation with timing may simply align transmitted segments with received segments. While workable, it may be complicated, particularly when a data packet is delayed enough to push it into the next time segment.

Feedback information with respect to network health may consider one-way network latency. That is, one-way network latency may be an example of feedback as used herein for routing decisions. As the load on a network increases, internal queues (to the connected network) may start to grow and data packets may be delayed. As this is a delayed real-time system, the delay is the important piece of information. Packets delayed too long might as well be lost as their parent frame may need to be reconstructed on time or fail. By monitoring the one-way delay from the transmitter to the receiver (e.g. the network latency), and watching both the absolute value and the rate of change in the value of one-way network latency, the transmitter or controller is able to anticipate when an RF interface module may be overloaded and react before failure occurs. Accordingly, embodiments described herein may estimate one-way network latency which may be used by system as feedback. The one-way network latency may enable embodiments described herein to account for asynchronous load on a network.

Lost packets may be good for indicating a connection has failed. RSSI may be good for indicating a connection might be usable, but gives no indication of actual network loading. Network latency may allow the system to anticipate connection failure, and re-route data packets accordingly.

Figure 9:
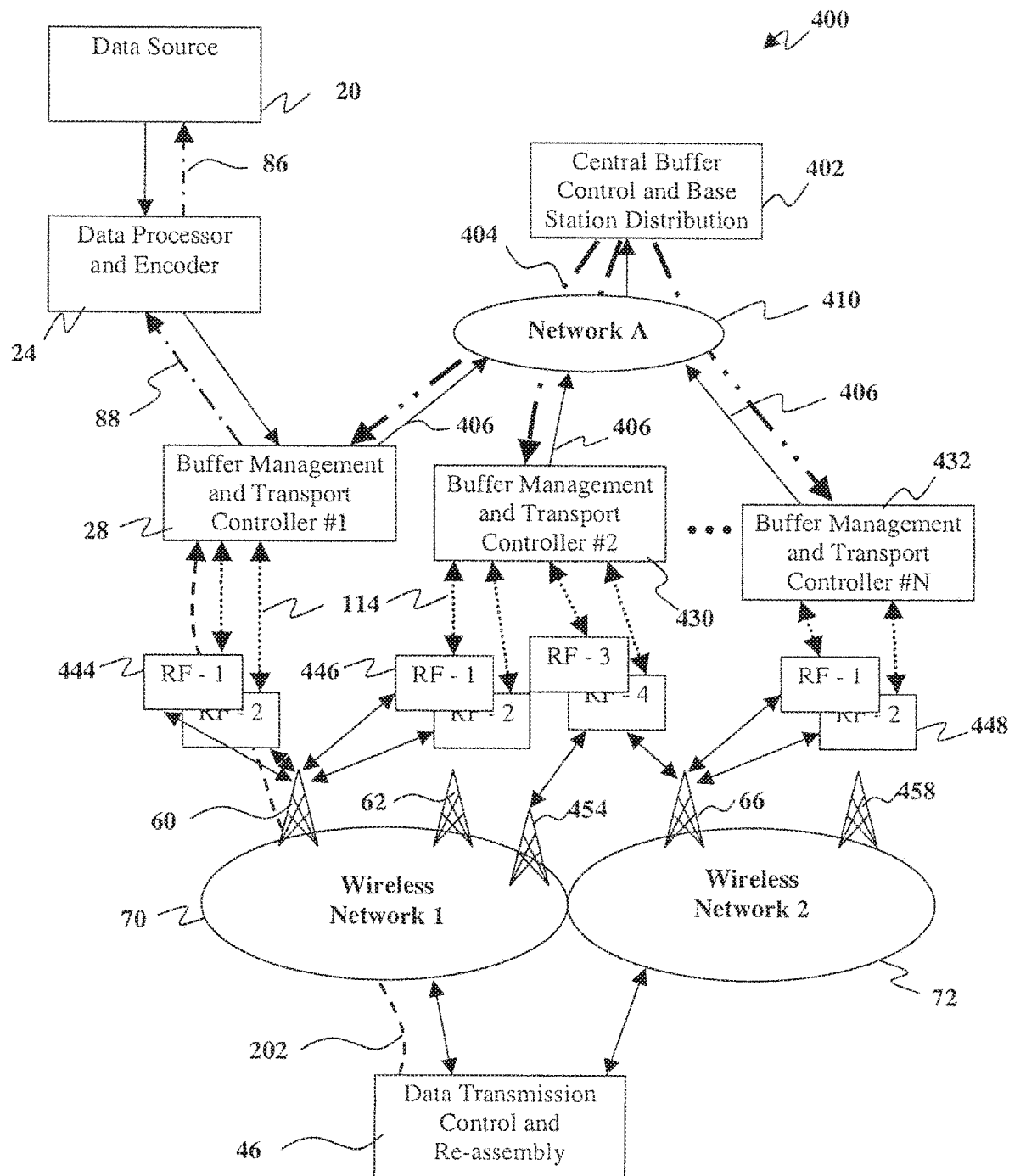
FIG. 9 is a block diagram of an exemplary system showing simultaneous delivery over multiple networks to maximize throughput.

FIG. 9 is a block diagram of an exemplary system 400 showing multiple occurrences of buffer management and transport controllers working over multiple wireless networks such as 460 and 462 with a central controller 402 providing additional feedback mechanisms. In a system with multiple wireless networks such as 460 and 462, and multiple occurrences of the system being used, the system allows for an additional feedback 404 mechanism to further assist with the delivery of Transport Buffers such as 444, 446 and 448. Due to the volume of information that must be transmitted from Buffer Management and Transport Controllers 412, 430 and 432 it must be recognized that serious loads may be placed upon one or more Wireless Networks 460 and 462. Although five base stations are shown over two wireless networks, these are limitations of the illustration and do not represent real limitations. The nature of large quantities of data such as normal definition and high definition audio and video may require advanced methods to be undertaken to ensure success in the overall system 400. As the number of installed and working systems in a given region increase they will require a Central Buffer Control and Base Station Distribution 402 component to assist in improving the overall system 400.

In system 400 as Buffer Management and Transport Controller #1, #2 and #N (412, 430 and 432) receive feedback information 114 and 202 it is acted upon, but also routed as feedback information 406 to the Central Buffer Control and Base Station Distribution 402 component. If feedback information 202 is not present then only 114 is used from each RF Interface Module 444, 446 and 448. The ability to couple the Buffer Management and Transport Controllers 28, 430 and 432 to the Central Buffer Control and Base Station Distribution 402 component is managed through a wide-area Network A 410. This Network A may be a well-known network such as the Internet or it could be a private IP network. Connection into this network could be wired or wireless, for example a WiFi access point running in conjunction with the Internet or some other combination.

The resulting effect of having the Central Buffer Control and Base Station Distribution 402 component overseeing the system allows actions to be taken between different Buffer Management and Transport Controllers 412, 430 and 432. For example the Central Buffer Control and Base Station Distribution 402 component may detect that network 70 is reaching a saturation point and request that RF Interface Module 446 move its connection to another network 72 that is underutilized. These kinds of oversight decisions allow the system to be better balanced and allow it to provide additional control in the system to improve the throughput of Transport Buffers 16.

FIG. 10 provides a flow chart illustrating the flow of data from the mobile data source to the destination receiver. The data information is received from a data source and encoded into the selected type of data stream at step 502. When the data source is a video source it could be high definition (HD) broadcast quality data from a digital camera, some other direct source, or stored information that has originally created from a direct source. Other sources could include multimedia data, logging data and any form of data that is produced in large quantities that has a time critical aspect to the information. Depending on the data type, it can be encoded using many techniques to reduce the volume wherever possible. In the case where a video stream is being encoded, it is possible to follow one of many encoding methods that include compression, such as MPEG-4 and Multiple Descriptive Coding (MDC) discussed earlier.

This data stream may be encoded into data packets and stored in transport buffers (TBs) at step 504, based on a variety of parameters for eventual transmission. Some of these parameters include the number of available RF Interface Modules for transmission, the feedback from each of the RF Interface Module, the type of redundancy that is required for the data based on the number of available RF Interface Modules. Storage of data packets in transport buffers provides some lag time in the arrival of the data packets and subsequent frame reconstruction, but allows for dynamically changing wireless delivery conditions to be dealt with more effectively.

The feedback information from all sources is interpreted by controller (e.g. Buffer Management and Transport Controller 28) to make RF Interface Module routing choices at step 506. Feedback information may include network latency, RSSI, dramatic RSSI changes, sender bandwidth, receiver bandwidth, calculated throughput based on a time interval, instant throughput with delay at receiver versus sender, highest bandwidth sent per link, and average packet loss per link.

The interpretation of the feedback can result in a determination of whether one or more attached RF Interface Modules are being given too much data to transmit at step 508. If the data is not a problem a check is performed at step 512 to determine if a previous command was sent to reduce the amount of data being sent at step 512. If the amount of data has been restricted and the restriction is no longer required a command is sent to the Data Processor and Encoder 24 and possibly the Data Source 20 to increase the amount of data being processed, at step 518.

If one or more RF Interface Modules are receiving too much data then a command may be sent to the Data Processor and Encoder 24 at step 510 to reduce the amount of Data Stream information. A check may then be made at step 514 to see if the data source 20 can receive a command to reduce information. If it can, then a command is sent to the data source 20 at step 516 to reduce the quality and quantity of information to be encoded.

After these adjustments are made to the system a data packet from a Transport Buffer is pulled from memory and sent to the correct RF Interface Module based on the programmed logic, the feedback that has been processed and any parameters that have been set by the user at step 520. Parameters could include high and low watermarks for each attached RF Interface Module, the maximum saturation of transmitted data through a given Wireless Network based upon total transport buffers transmitted.

In some examples, video encoders can have a higher latency—for example, at normal GTG values, the latency for video encoders can be typically in the 500-700 ms range. For sub-second GTG this is a significant portion of the available network buffer. To help counteract this the amount of lookahead can be reduced at the expense of reduced compression efficiency (i.e. more bits are required for the same video quality).

In other examples, switching away from a normal GOP with large I-frames to a mode (periodic intra refresh) where I-macroblocks are spread over multiple frames is possible in order to support low G2G latency. This is because a typical 1-frame might be anywhere from 10-30× larger than a P-frame.

For example, if the encoder is configured for 1 Mbit/s (e.g. since the aggregate connection throughput is 1 Mbit/s), and the initial I-frame that comes out of the encoder is 500 Kbit. That I-frame alone will take 500 ms to arrive at the player, again significantly eating into a sub-second GTG. Spreading intra-information over multiple frames allows the frames to be more uniform in size, which can prevent this problem. FIG. 11 is a flow chart illustrating the flow of data to determine which paths to use for delivery it to a destination. This more detailed flow chart expands the logic within steps 506 and 508 of FIG. 10.

At step 602 there are many elements of state information that can be examined to determine the best course of action (e.g. selection of RF interface module and/or network based on the feedback). The examinations that follow at steps 604, 610, 620 and 630 are a subset to represent the types of detailed behaviors that can be examined for. This state information may include internal state information (such as the size of current buffer levels), external state information (such as feedback from the RF Interface Modules), and Central Buffer Control Information (such as the overall saturation of a given base station across all occurrences of the invention).

Examination step 604 examines the current RSSI value from a given RF Interface Module. The RSSI value can be used in many ways. A straightforward high water and low water mark could be used to determine at this point in time if an RF Interface Module is maintaining good coverage with the currently attached base station. A historical metric could be used to determine if the RSSI value has changed too dramatically from the last RSSI value provided by an RF Interface Module. Several RSSI levels may be averaged to determine if there is a negative trend that indicates a pending failure. Whatever technique is used the RSSI may be a very useful feedback element from the RF Interface Module to determine what is happening if the RF interface module link to a given Wireless Network.

At step 606, if the RSSI value is a concern then the amount of Transport Buffer information given to this RF Interface Module is reduced. A flag is then set at step 608 to indicate the RSSI value for this RF Interface Module is a concern and processing moves to step 610.

If the RSSI value was not a concern, or after setting an RSSI concern flag, a check is performed on the current transmit buffer level at step 610. This internal value could be used to indicate that the buffer for this RF Interface Module is being drained too slowly compared to a preconfigured rate of usage. This rate could also be seen as the rate at which the transport buffer is being emptied (e.g. output rate) compared to how quickly it is being filled (input rate). If this transport buffer exhaustion rate falls below a determined value then the number of transport buffer being given to a specific RF Interface Module is reduced at step 612. The buffer level bad flag is set for this RF Interface Module at step 614 and the processing proceeds to step 620. Embodiments described herein may match the rate of data going into a transport buffer (input rate) with the rate of data taken out of the transport buffer (output rate) based on received feedback of network conditions (both transmitter and receiver related conditions). The input rate may be responsive to the output rate, as determined based on the feedback of network conditions.

If the buffer rate was not a concern, or after setting the buffer rate with a bad flag, a check is performed on the packet loss per connection at step 620. This calculated value may be performed in several ways. For example, the number of transmit attempts through a given RF Interface Module may be compared to a success rate. The number of base station collisions when transmitting could be compared to the number of transmits attempted. When too many collisions occur on an average amount of transmit attempts it usually indicates that the base station is getting saturated and is not keeping up. If the packet loss per RF Interface Module connection is too high then the number of transport buffers given to this RF Interface Module is reduced at step 622. A packet loss problem flag is set and processing moves to step 60.

Other possible checks include the total number of active connections and changes to those connections. Looking at the uptime per connection and comparing that to the amount of time the RF Interface Module is actually considered out of coverage and number to communicate with the base station. The throughput per connection based on feedback from the destination receiver could also be examined. This feedback could also have the time delay or latency for transmitting a transport buffer through a given wireless network. Current state information could also include GPS location data, and the time of day. Time of day information could allow for checks on peek and busy periods of the day, allowing certain RF Interface Modules to avoid heavier transmissions in certain dense downtown regions during peak periods. Overall sustainable bandwidth can also be determined based on data transmit per RF Interface Module averaged per second or minute.

Once all possible state informational elements are examined, an overall count of the number of flags set is performed at step 640. This check could be done on one RF Interface Module, or across all RF Interface Modules. Some programmed or configured high-water mark might have to be reached in order to take the bigger step of reducing the amount of data to be encoded into transport buffers at the source. If the number of flags set was too high, then processing moves to step 642, where a flag is set to reduce data at the source. Processing then moves to step 510 of FIG. 10. The reduce data at source flag will be used later when it might be necessary to turn on full data flow once again. If the number of flags set were not too high then processing proceeds to 512 of FIG. 10, where the flag will be checked and the amount of data being set may be increased.

Although embodiments have been described herein with reference to certain specific embodiments, various modifications thereof will be apparent to those skilled in the relevant art.

We claim:

1. A system for communicating data over a plurality of communication links comprising:
   a plurality of communication interfaces configured to communicate a plurality of data packets representing a data stream to the plurality of communication links to aggregate throughput across the plurality of communication links, wherein the plurality of communication interfaces are configured to provide one or more connectivity conditions to the computer processor regarding the plurality of communication links; and
   a computer processor operating in conjunction with computer memory, configured to process the one or more connectivity conditions to: for a data packet of the plurality of data packets and prior to a communication of the data packet, withdraw the data packet from a transport buffer of one or more transport buffers and select a communication interface of the plurality of communication interfaces for the communication of the data packet over at least one of the plurality of communication links.

2. The system of claim 1, wherein the computer processor is configured to receive the plurality of data packets from the plurality of communication links for reassembly.

3. The system of claim 2, wherein the computer processor is configured to provide receiver feedback regarding additional connectivity conditions for the plurality of communication links, and wherein the computer processor is further configured to process the receiver feedback to select a communication interface of the plurality of communication interfaces for the communication of the data packet.

4. The system of claim 1, wherein the computer processor is configured to match an input rate for the plurality of data packets with a withdraw rate for the plurality of data packets at a transport buffer of the multiple transport buffers using the connectivity conditions.

5. The system of claim 1, wherein the one or more connectivity conditions comprises one-way network latency, and wherein the one-way network latency comprises a delay between when a data packet is communicated and when the data packet is received.

6. The system of claim 1, wherein at least one communication interfaces of the plurality of communication interfaces concurrently maintains multiple network connections to the plurality of communication links.

7. The system of claim 1, wherein the computer processor is configured, using the received connectivity conditions, to dynamically and selectively redirect a data packet of the plurality of data packets from one communication interface to another communication interface of the plurality of communication interfaces, and from one available network to another available network of the plurality of communication links, whereby data throughput to a destination receiver is maintained.

8. The system of claim 1, wherein the connectivity conditions comprise information relating to:
   an error rate for each communication interface of the plurality of communication interfaces based on the assembled packets that are not delivered at the destination for re-assembly; and
   a capacity condition for each communication interface of the plurality of communication interfaces based on the assembled packets that are delivered at the destination for re-assembly.

9. The system of claim 1, wherein the computer processor is configured to control:
   delivery of each data packet of the plurality of data packets from a transport buffer of the multiple transport buffers to a corresponding communication interface of the plurality of communication interfaces; and
   communication, for re-assembly at a destination, of each data packet of the plurality of data packets from the plurality of communication interfaces for communication over one of the plurality of communication links.

10. The system of claim 1, wherein the computer processor is configured to use the received connectivity conditions to control at least one of the quantity and the quality of the captured continuous real-time stream.

11. The system of claim 1, wherein the computer processor is further configured to route redundant packets to at least one communication interface of the plurality of communication interfaces for increased communication reliability.

12. The system of claim 1, wherein the one or more connectivity conditions are selected from the group consisting of: one-way network latency, glass-to-glass latency, communicate collisions at one or more said simultaneously available different communication links; the number of the modules in the communication with each said simultaneously available different network; throughput requirements of the plurality of modules for the communication on each said simultaneously available different network; coverage drop-off indicators; time between successful communication attempts; status values; Received Signal Strength Indicator (RSSI); packet retransmissions; average packet loss per link; sender bandwidth; destination bandwidth; current available bandwidth; and combinations thereof.

13. The system of claim 1, wherein the computer processor is further configured, using the one or more connectivity conditions, to control a communication rate of data packets to a corresponding communication interface module of the plurality of communication interface modules from the multiple transport buffers.

14. The system of claim 1, wherein at least one of the communication interfaces of the plurality of communication interfaces is configured to apply congestion control to establish and maintain a communication rate of data packets.

15. The system of claim 14, wherein the at least one of the communication interfaces of the plurality of communication interfaces is configured to apply congestion control by determining a congestion avoidance threshold.

16. The system of claim 15, wherein an initial value of the congestion avoidance threshold is determined as a function of a measured communication rate.

17. The system of claim 16, wherein a target communication rate is determined based on at least one of the congestion avoidance threshold and a measured communication latency.

18. The system of claim 16, wherein the congestion avoidance threshold is increased when a measured communication latency is within a pre-defined range.

19. A method for communicating data over a plurality of communication links, the method comprising:
communicating a plurality of data packets representing a data stream to the plurality of communication links to aggregate throughput across the plurality of communication links, wherein the plurality of communication interfaces are configured to provide one or more connectivity conditions to the computer processor regarding the plurality of communication links; and
processing the one or more connectivity conditions to: for a data packet of the plurality of data packets and prior to a communication of the data packet, (i) withdraw the data packet from a transport buffer of one or more transport buffers and (ii) select a communication interface of the plurality of communication interfaces for the communication of the data packet over at least one of the plurality of communication links.

20. A non-transitory computer readable medium storing machine-interpretable instructions, which when executed by a processor, cause the processor to perform a method for communicating data over a plurality of communication links, the method comprising:
communicating a plurality of data packets representing a data stream to the plurality of communication links to aggregate throughput across the plurality of communication links, wherein the plurality of communication interfaces are configured to provide one or more connectivity conditions to the computer processor regarding the plurality of communication links; and
processing the one or more connectivity conditions to: for a data packet of the plurality of data packets and prior to a communication of the data packet, (i) withdraw the data packet from a transport buffer of one or more transport buffers and (ii) select a communication interface of the plurality of communication interfaces for the communication of the data packet over at least one of the plurality of communication links.

* * * * *